(12) United States Patent
Shoudy et al.

(10) Patent No.: US 12,514,557 B2
(45) Date of Patent: Jan. 6, 2026

(54) DRUG DELIVERY SYSTEM WITH REAL-TIME MOTION COMPENSATION AND DOSE ACCUMULATION

(71) Applicant: GE Precision Healthcare LLC, Wauwatosa, WI (US)

(72) Inventors: David Shoudy, Niskayuna, NY (US); Jhimli Mitra, Niskayuna, NY (US); Heather Y. Chan, Albany, NY (US); David Mills, Niskayuna, NY (US); Spiros Kotopoulis, Kløfta (NO)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 368 days.

(21) Appl. No.: 18/194,393

(22) Filed: Mar. 31, 2023

(65) Prior Publication Data
US 2024/0324999 A1    Oct. 3, 2024

(51) Int. Cl.
*A61B 8/00*    (2006.01)

(52) U.S. Cl.
CPC .............. *A61B 8/483* (2013.01); *A61B 8/42* (2013.01); *A61B 8/466* (2013.01)

(58) Field of Classification Search
CPC ........... A61B 8/483; A61B 8/42; A61B 8/466; A61B 8/4427; A61B 8/4472; A61B 8/469; A61B 8/481; A61B 8/5223; A61B 8/486; A61B 8/488; A61B 8/565; A61B 8/461; A61B 8/085; A61M 37/0092; A61M 2037/0007; A61N 7/00; A61N 7/02;
(Continued)

(56) References Cited

U.S. PATENT DOCUMENTS 5,769,790 A     6/1998  Watkins et al.
6,428,477 B1 *  8/2002  Mason ................. G01S 15/899
                                              601/3
(Continued)

OTHER PUBLICATIONS

Zhang et al, "A Dual-Mode 2D Matrix Array for Ultrasound Image-Guided Noninvasive Therapy", IEEE Transactions on Biomedical Engineering (Year: 2021).*
(Continued)

*Primary Examiner* — Tom Y Lu
(74) *Attorney, Agent, or Firm* — McCoy Russell LLP

(57) ABSTRACT

Various methods and systems are provided for an ultrasound-mediated therapy system. In one example, a method includes for one or more therapeutic ultrasound beams of a plurality of therapeutic ultrasound beams delivered to a therapy region of interest (ROI) via an ultrasound probe, identifying a respective location of the one or more therapeutic ultrasound beams relative to the therapy ROI based on: a respective modeled beam profile, a respective live two-dimensional (2D) image of the therapy ROI acquired with the ultrasound probe, a respective position of the ultrasound probe, and a known prior location of the therapy ROI, calculating a cumulative therapeutic ultrasound dose received at each sub-region of the therapy ROI based on the respective location of the one or more therapeutic ultrasound beams; and outputting an indication of the cumulative therapeutic ultrasound dose received at each sub-region of the therapy ROI for display on a display device.

19 Claims, 16 Drawing Sheets
(5 of 16 Drawing Sheet(s) Filed in Color)

(58) Field of Classification Search
CPC .... A61N 2007/0004; A61N 2007/0052; A61N 2007/0078; A61N 2007/0082; G06T 7/70; G06T 17/00
See application file for complete search history.

(56) References Cited

U.S. PATENT DOCUMENTS

| | | | |
|---|---|---|---|
| 6,618,620 B1 | 9/2003 | Freundlich et al. | |
| 7,510,536 B2 | 3/2009 | Foley et al. | |
| 7,699,780 B2 | 4/2010 | Vitek et al. | |
| 8,251,908 B2 | 8/2012 | Vortman et al. | |
| 9,814,909 B2 | 11/2017 | Levy et al. | |
| 10,475,192 B2 | 11/2019 | Levy et al. | |
| 2010/0069754 A1* | 3/2010 | Raju | B06B 1/0625 600/439 |
| 2020/0147415 A1* | 5/2020 | Konofagou | A61B 5/389 |
| 2020/0353292 A1* | 11/2020 | Hunt | A61N 7/02 |
| 2021/0228913 A1 | 7/2021 | Burdette et al. | |
| 2021/0283428 A1* | 9/2021 | Konofagou | A61N 7/02 |
| 2024/0366969 A1* | 11/2024 | Xu | A61B 8/5269 |

OTHER PUBLICATIONS

Ebbini. E. et al., "Ultrasound-guided therapeutic focused ultrasound: Current status and future directions," International Journal of Hyperthermia, vol. 31, No. 2, Jan. 23, 2015, 14 pages.

Ozkan, E. et al., "Robust motion tracking in liver from 2D ultrasound images using supporters," International Journal of Computer assisted radiology and surgery, vol. 12, No. 6, Jun. 2017, 10 pages.

Dai, X. et al., "Deep learning-based motion tracking using ultrasound images," Medical Physics, vol. 48, No. 12, Dec. 2021, Available Online Nov. 13, 2021, 10 pages.

\* cited by examiner

DRUG DELIVERY SYSTEM WITH REAL-TIME MOTION COMPENSATION AND DOSE ACCUMULATION

FIELD

The present description relates generally to methods and systems for ultrasound-mediated drug delivery, specifically targeted localization and dose accumulation techniques for an ultrasound-mediated drug delivery system.

BACKGROUND

Medical ultrasound is an imaging modality that employs ultrasound waves propagating through the internal structures of a body of a patient and produce a corresponding image. For example, an ultrasound probe comprising a plurality of transducer elements emits ultrasonic waves which reflect or echo, refract, or are absorbed by structures in the body. Medical ultrasound may also be used to aid in therapeutic treatment of lesions such as malignant tumors within a patient. For example, ultrasonic waves of a specified frequency may be used for sonoporation to modify permeability of a cell membrane. In combination with microbubble platforms, sonoporation may enhance membrane translocation of molecular therapeutics (e.g., chemotherapy agents) at targeted locations. Therapeutic ultrasound treatment of this type may be image-guided, whereby an ultrasound system delivers both therapeutic beams and imaging beams in order to image a patient during and/or prior to a therapy session.

BRIEF DESCRIPTION

In one embodiment, a method is provided including for one or more therapeutic ultrasound beams of a plurality of therapeutic ultrasound beams delivered to a therapy region of interest (ROI) of a patient via an ultrasound probe, identifying a respective location of the one or more therapeutic ultrasound beams relative to the therapy ROI of the patient based on: a respective modeled beam profile of the one or more therapeutic ultrasound beams, live two-dimensional (2D) images of the therapy ROI acquired with the ultrasound probe, a respective position of the ultrasound probe, and a known prior location of the therapy ROI; calculating a cumulative therapeutic ultrasound dose received at each sub-region of the therapy ROI based on the respective location of the one or more therapeutic ultrasound beams; and outputting an indication of the cumulative therapeutic ultrasound dose received at each sub-region of the therapy ROI for display on a display device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will be better understood from reading the following description of non-limiting embodiments, with reference to the attached drawings, wherein below.

DETAILED DESCRIPTION

Figure 1:
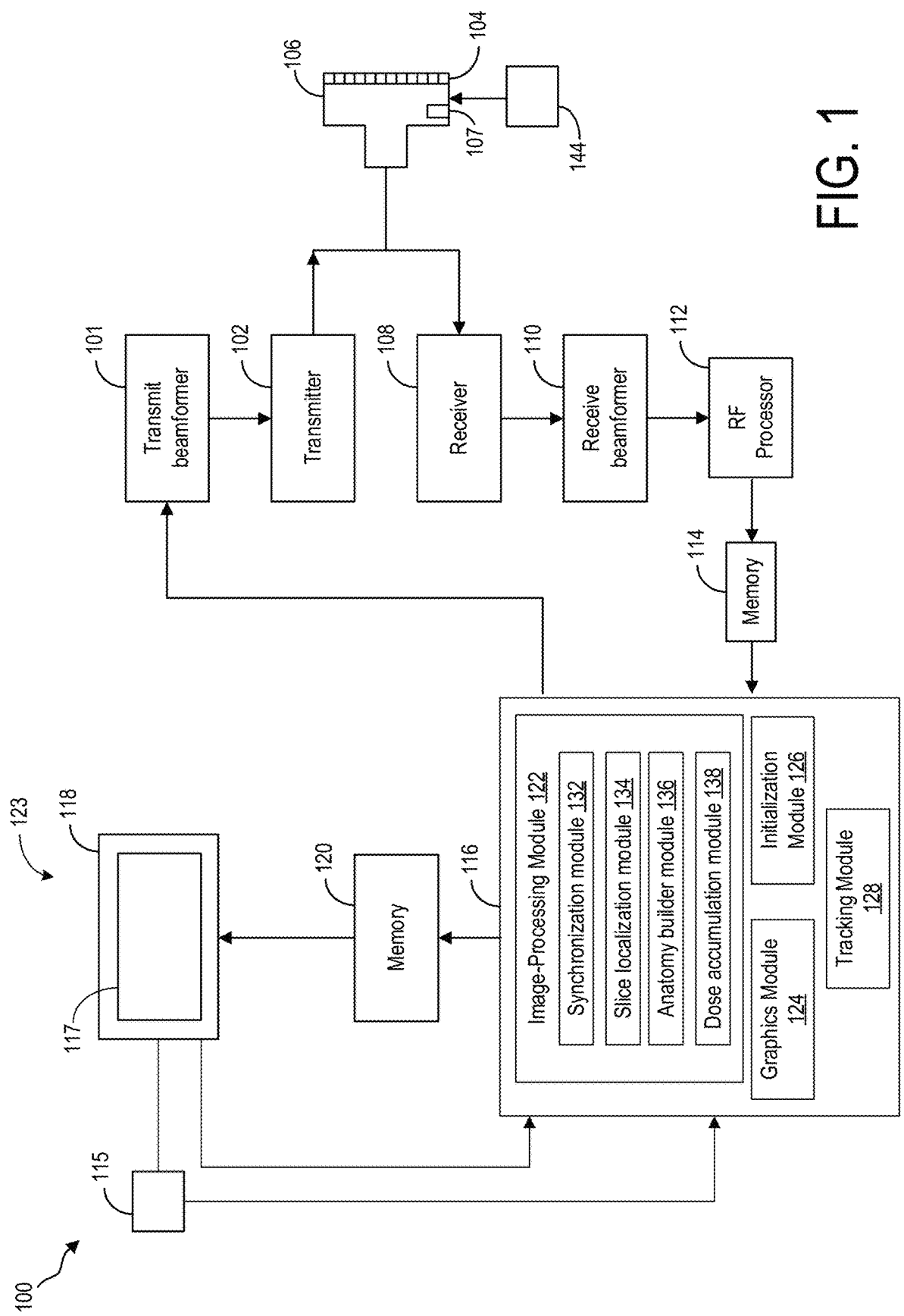
FIG. 1 schematically shows an ultrasonic therapy delivery system according to an embodiment.

Ultrasound beams may be used in a variety of ways in both diagnostics and therapeutics in order to image a patient and/or deliver a type of therapy to a patient. Some example therapies that utilize therapeutic ultrasound beams include sonoporation or thermal treatments. Sonoporation and similar terms may refer to pulses of sound energy, such as emitted from an ultrasound device, sufficient to assist in inducing delivery of a compound, such as a chemotherapy agent, into a cell by inducing openings in a membrane of the cell, which allows for increased uptake of the compound into the cell. Additional microbubble technologies or platforms may be used in combination with sonoporation to increase efficacy of uptake of such compounds. Thermal treatments with ultrasound devices comprise emitting ultrasound beams (e.g., ultrasound waves) at high power in order to ablate tissues. Therapeutic ultrasounds as used in sonoporation and thermal therapy may be applied via a conventional ultrasound device configured to emit ultrasound beams in a specified frequency range configured for the specified type of treatment.

Current image-guided ultrasonic therapy systems and methods either assume predefined positions of a therapy region of interest (ROI) within a patient and an energy application device (an ultrasound probe) or make use of user estimated determinations for positioning of the ultrasound probe with relation to the target ROI via real-time imaging. If unplanned movement of either the ultrasound probe or the patient occurs, including periodic and/or non-periodic motion such as respiratory motion and/or shifts in body position, respectively, therapy may be delivered to healthy tissues surrounding the therapy ROI. Additionally, repeat or additional therapy dose deliveries may be needed in order to adequately treat the tissues within the therapy ROI, which may be inefficient and time-consuming and may affect patient outcomes.

Thus, systems and methods for targeted ultrasound-mediated therapy delivery are disclosed herein to at least partly address the above-described issues. In one example, the system is an ultrasound system that includes an ultrasound probe including a plurality of transducers configured to both image a patient and emit therapeutic ultrasound beams. The ultrasound probe includes one or more position sensors configured to identify a position and orientation of the ultrasound probe in real-world coordinates wherein the position and orientation of the ultrasound probe may be identified for each ultrasonic image of a plurality of ultrasonic images acquired as part of a time series. From the plurality of ultrasonic images and the known corresponding positions/orientations of the probe for each of the ultrasonic images, a three-dimensional (3D) pre-therapy anatomy model (e.g., a volumetric anatomy model) may be generated. Annotation of the 3D pre-therapy anatomy model may define a target ROI (e.g., therapy ROI) for therapeutic dose delivery, where the annotation may be performed manually via user inputs and/or via a computer based algorithm. The target ROI may be, in some examples, an anatomical feature such as an organ, lesion, or tumor and may be represented as a 3D model configured as a 3D shape such as a cuboid, ellipsoid, or other arbitrary 3D shape. The target ROI may be divided into sub-regions, with each sub-region being represented by a voxel of the 3D model. Further, each sub-region may be provided with a prescribed dose of the therapeutic ultrasound beams (e.g., threshold level), which may correspond to a prescribed dose of the therapy admitted to the cells in the therapy ROI (e.g., a chemotherapeutic drug). The prescribed doses of each of the sub-regions may be identified from a prescribed dose map for the target ROI. Dose accumulation may be calculated and displayed in various ways within a graphical user interface (GUI), including adjusting a color of each of the voxels representative of respective sub-regions, indicating to the user which sub-regions have completed dose accumulation and which have not.

Additionally, methods provided may provide a strategy for motion compensation by tracking gross motion of the target ROI, where gross motion is movement that affects a relative position of the target ROI. Gross motion of the target ROI may cause at least a portion of the ROI to be displaced, leading to, as described above, non-targeted therapy delivery where therapy is delivered outside the target ROI. During acquisition of the plurality of ultrasound images used to reconstruct a 3D anatomy model, images may be acquired with the patient in a plurality of respiratory phases, the plurality including at least two different phases. The phases may be, for example, an inhale, an exhale, a deep inhale, a deep exhale, nominal, and/or the like. Multiple 3D anatomy models may be reconstructed using data from each imaged phase of the respiration cycle, and a superset of the multiple 3D pre-therapy anatomy models may be used to define a spectrum of possible locations of the target ROI. Each of the 3D pre-therapy anatomy models may be resampled into 2D slices which may be compared to a live 2D image in order to determine where the live target ROI is in real-world coordinates. Using one of the multiple 3D pre-therapy anatomy models or the spectrum of target ROI positions based on phases of the respiratory cycle, a search space may be defined based on the ROI motion trajectory within the 3D pre-therapy respiratory models, and 2D slices within that search space may be compared to the live 2D ultrasound image. By applying a similarity metric, a 2D slice that best matches the live 2D ultrasound image may be determined, wherein the 2D slice with the highest image similarity metric is identified as the best match. A transformation between the position of the 2D slice and the position of the probe when the live 2D ultrasound image is acquired may be used to infer the position of the live target ROI.

Before further discussion of the approach for compensating for gross motion and accumulating doses applied to a therapy ROI, an example platform for implementation of the approach is shown in FIG. 1. Therein, a block diagram of a system 100 is depicted, according to one embodiment. In the illustrated embodiment, the system 100 is an image-guided therapy system and, more specifically, an ultrasound image-guided therapy system. As shown, the system 100 includes multiple components. The components may be coupled to one another to form a single structure. In one example, the system 100 is a unitary system that is capable of being moved (e.g., portably) from room to room. For example, the system 100 may include one or more components configured to couple the system 100 to a wheeled cart. However, in other examples, at least portions of the system 100 may be configured to remain stationary and/or fixed in place.

In the illustrated embodiment, the system 100 includes a transmit beamformer 101 and transmitter 102 that drives an array of elements 104 (e.g., piezoelectric crystals) within a ultrasound probe 106 including a plurality of transducers to emit pulsed ultrasonic signals into a body or volume (not shown) of a subject. A transducer may include one or more elements of the array of elements 104. In some examples, the probe 106 may include one or more therapy transducers comprising one or more elements (of the array of elements 104) and an imaging transducer comprising one or more elements (of the array of elements 104). In some examples, the probe 106 may include two therapy transducers. Each of the transducers (e.g., both therapy transducers and imaging transducers) may comprise a row of elements of the array of elements 104, where elements of the imaging transducer are positioned intermediate to elements of the therapy transducers. The elements of the array of elements 104 and the probe 106 may have a variety of geometries and may be a 1D or 2D array. For example, the probe 106 may be a sector probe, a linear probe, a convex probe, a curvilinear probe, a phase array probe, etc. The probe 106 may be configured to emit both imaging beams and therapeutic beams, each at specific frequencies that differ from each other. For example, the probe 106 may emit imaging beams from imaging transducers having frequencies in a range of 2-6 MHZ and therapeutic beams from therapy transducers having frequencies in a range of 0.5-1 MHz, wherein the therapeutic beams are configured for sonoporation therapy, though in other examples the therapeutic beams may be configured for other types of ultrasound therapy.

The ultrasonic signals of imaging beams are back-scattered from structures in the body, for example, blood vessels and surrounding tissue, to produce echoes that return to the elements 104. The echoes are received by a receiver 108. The received echoes are provided to a receive beamformer 110 that performs beamforming and outputs an RF signal. The RF signal is then provided to an RF processor 112 that processes the RF signal. Alternatively, the RF processor 112 may include a complex demodulator (not shown) that demodulates the RF signal to form IQ data pairs representative of the echo signals. The RF or IQ signal data may then be provided directly to a memory 114 for storage (for example, temporary storage).

The probe 106 may further include one or more position sensors 107 configured to output data indicative of position and orientation of the probe at various times in a time series. The one or more position sensors 107 may be electromagnetic sensors, optical trackers, inertial measurement units (IMUs), or other suitable 3D position sensors. An electromagnetic field generator 144 may be in communication with the one or more position sensors 107 to provide an electromagnetic field usable by the one or more position sensors 107 to determine probe position and orientation. The one or more position sensors 107 may be configured to generate output usable to localize the probe 106 in real-world coordinates. Localizing or mapping in real-world coordinates as herein used may describe localizing points to a defined coordinate system defined within a space that the points are in. For example, the coordinate system may be relative to components such as a floor, walls, ceiling, and other fixed objects in space that provide a system to map relative positions to. As such, mobile components, such as the probe 106, may move within the coordinate system and the one or more position sensors 107 may localize a position of the probe 106 within the defined coordinate system.

The system 100 also includes a system controller 116 as part of a computing device that includes a plurality of modules configured to perform various tasks as described herein. The system controller 116 is configured to control operation of the system 100. For example, the system controller 116 may include an image-processing module 122 that receives image data (e.g., ultrasound signals in the form of RF signal data or IQ data pairs) and processes image data. Image-processing module 122 may be one of one or more processors of the computing device. For example, the image-processing module 122 may process the ultrasound signals to generate slices or frames of ultrasound information (e.g., ultrasound images) for displaying to the user. The image-processing module 122 may be configured to perform one or more processing operations according to a plurality of selectable ultrasound modalities on the acquired ultrasound information. By way of example only, the ultrasound modalities may include color-flow, acoustic radiation force imaging (ARFI), B-mode, A-mode, M-mode, spectral Doppler, acoustic streaming, tissue Doppler module, C-scan, and elastography, speckle tracking, and chamber quantification. The generated ultrasound images may be 2D or 3D. When multiple 2D images are obtained, the image-processing module may also be configured to stabilize or register the images. The therapy modalities (e.g., the therapeutic beams) may be transmitted to perform sonoporation, thermal therapy, cavitation therapy, permeabilization, shockwave therapy, among others. The system 100 herein described may be configured for sonoporation therapy, specifically, though other therapy modalities are possible with the system 100.

Acquired ultrasound information may be processed in real-time during an imaging and/or therapy session (or scanning session) as the echo signals are received. Additionally or alternatively, at least some the ultrasound information may be stored temporarily in the memory 114 during an imaging session and processed in less than real-time in a live or off-line operation. An image memory 120 is included for storing processed slices of acquired ultrasound information that are not scheduled to be displayed immediately. The image memory 120 may comprise any known data storage medium, for example, a permanent storage medium, removable storage medium, and the like. Additionally, the image memory 120 may be a non-transitory storage medium.

In operation, an ultrasound system may acquire data, for example, 2D data sets by various techniques including 2D scanning with 2D probes having positioning sensors as will be further described. Ultrasound images of the system 100 may be generated from the acquired data (at the system controller 116) and displayed to the user or operator on the display device 118. The probe 106 may be configured as a hand held (e.g., freehand) 2D probe. The user or operator of the system 100 may manually move the probe 106 to different positions in order to image and/or apply therapy doses to the patient. Manual operation of the probe 106 may allow for real-time adjustment of positioning and orientation in order to apply therapy doses to intended target regions. Additionally, the methods herein described may be performed with any suitable 2D ultrasound probe as 3D images are not demanded to be acquired primarily by the probe 106 but should be reconstructed from the 2D images, and their locations in real-world co-ordinates. Furthermore, the probe may also acquire 3D images (e.g., if the probe contains a 2D array) and the movement of the probe may result in, for example, a 3D image with a wider field of view than what was possible by imaging from a fixed probe location.

The system controller 116 is operably connected to a user interface 123 that enables an operator to control at least some of the operations of the system 100. The user interface 123 may include hardware, firmware, software, or a combination thereof that enables an individual (e.g., an operator) to directly or indirectly control operation of the system 100 and the various components thereof. As shown, the user interface 123 includes a display device 118 having a display area 117. In the examples described herein, the display device 118 is a touchscreen display that enables the operator to adjust operating parameters of the system 100 by directly interacting with (e.g., touching) the display device 118. For example, the display device 118 may be configured such that when the user moves a finger/glove/stylus across the face of the display device 118, a cursor atop the ultrasound image on the display area 117 moves in a corresponding manner. The display device 118 may detect a presence of a touch from the operator on the display area 117 and may also identify a location of the touch in the display area 117. The touch may be applied by, for example, at least one of an individual's hand, glove, stylus, or the like. As such, the touch-sensitive display may also be characterized as an input device that is configured to receive inputs from the operator.

The display device 118 also communicates information from the system controller 116 to the operator by displaying the information to the operator. The display device 118 and/or the user interface 123 may also communicate audibly. The display device 118 is configured to present information to the operator during the imaging and/or therapy session. The information presented may include ultrasound images, graphical elements, user-selectable elements, and other information (e.g., administrative information, personal information of the patient, and the like). In some embodiments, the user interface 123 may be additionally configured to interface with (e.g., electronically couple to) one or more user interface input devices 115, such as a physical keyboard, mouse, and/or touchpad.

In addition to the image-processing module 122, the system controller 116 may also include a graphics module 124, an initialization module 126, and a tracking module 128. The image-processing module 122, the graphics module 124, the initialization module 126, and the tracking module 128 may coordinate with one another to present information to the operator during and/or after the imaging session. For example, the image-processing module 122 may be configured to display an acquired image on the display device 118 and the graphics module 124 may be configured to display designated graphics along with the ultrasound image, such as graphical outlines, which represent lumens or vessel walls in the acquired image. The tracking module 128 may connect to or otherwise be in communication with the one or more sensors 107 and the electromagnetic field generator 144 to track and log positions and orientations of the probe 106 at various times.

The image-processing module 122 may further include various sub-modules for image processing. For example, the image-processing module 122 may include a synchronization module 132, a slice localization module 134, an anatomy builder module 136, and a dose accumulation module 138. The synchronization module 132 may associate data from the position sensors 107 of the probe 106 and images acquired with the probe 106. Data from the position sensors 107 may be independent from the image data but both may be acquired as a part of a time series. The synchronization module 132 may utilize the time series of both the image data and the position/orientation data in order to determine the orientation and position of the probe 106 for each of a plurality of images acquired with the probe 106. The slice localization module 134 may resample a reconstructed 3D volume (e.g., a 3D pre-therapy anatomy model) into a plurality of 2D slices and may then utilize a similarity metric to determine which of the 2D slices within a defined search space best matches an obtained live 2D ultrasound image. Such similarity metrics include cross correlation, mutual information, pattern intensity, mean squares error, or structural similarity index. The anatomy builder module 136 may be configured to generate/reconstruct the 3D pre-therapy anatomy model (not shown) of a structure from a plurality of 2D images, each including a portion of the structure, and may generate a 3D model of a therapy ROI (e.g., target ROI) based on annotation input defining the position of the therapy ROI within the 3D pre-therapy anatomy model. The dose accumulation module 138 may be configured to calculate a cumulative number of pulses (e.g., therapeutic doses) applied to sub-regions of the therapy ROI, wherein each sub-region is represented by a voxel of the 3D model and is provided a prescribed or target dose (e.g., a threshold level). Further, in some examples, the dose accumulation module 138 may compare the calculated cumulative dose applied to a sub-region versus the prescribed dose in order to indicate to a user whether or not the prescribed dose has been met or exceed for said sub-region.

The image-processing module 122 may also include a 3D processor sub-module which may be controlled by the user interface 123 and may access the memory 114 to obtain 3D ultrasound image data. Three-dimensional images may thereby be generated through volume rendering or surface rendering algorithms, for example, as well as techniques such as ray-casting, maximum intensity pixel projection, etc. The sub-modules for image processing as herein described may send data to the user interface to display representations of positions and orientations of the therapy ROI (e.g., live therapy ROI and/or therapy ROIs specific to respiratory phases), the probe 106, the therapeutic ultrasound beam, and a modeled beam profile (e.g., a beam profile that is simulated based on a defined model or measured), among others. The user interface 123 may display said representations on the display device 118.

Additionally in some instances, the slice localization module 134 may be configured to determine a boundary or border of the therapy ROIs for various respiratory phases, the boundary or border defining a spectrum of possible positions for the live therapy ROI. Additionally, in some examples, the anatomy builder module 136 may be configured to divide or segment the therapy ROI into sub-regions, wherein each sub-region is a voxel of a 3D model of the therapy ROI. The anatomy builder module 136 and the dose accumulation module 138 may communicate with the user interface 123 in order to display representations of each sub-region, e.g., voxels, within the 3D model of the live therapy ROI and to alter or adjust a color of each of the displayed voxels based on cumulative dose calculated for each sub-region. The color of each of the displayed sub-regions may indicate to the operator of the system 100 which sub-regions of the live therapy ROI may demand additional therapeutic doses. Displayed color adjustments based on dose accumulation may provide for reduced overall treatment duration and reduced dosage received by healthy tissues.

As used herein, the terms "sensor," "system," "unit," or "module" may include a hardware and/or software system that operates to perform one or more functions. For example, a sensor, module, unit, or system may include a computer processor, controller, or other logic-based device that performs operations based on instructions stored on a tangible and non-transitory computer readable storage medium, such as a computer memory. Alternatively, a sensor, module, unit, or system may include a hard-wired device that performs operations based on hard-wired logic of the device. Various modules or units shown in the attached figures may represent the hardware that operates based on software or hard-wired instructions, the software that directs hardware to perform the operations, or a combination thereof.

"Systems," "units," "sensors," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

System controller 116 is configured to control the transmit beamformer 101, the transmitter 102, the receiver 108, and the receive beamformer 110. The system controller 116 is in electronic communication (e.g., communicatively connected) with the probe 106. For purposes of this disclosure, the term "electronic communication" may be defined to include both wired and wireless communications. The system controller 116 may control the probe 106 to acquire data according to instructions stored on a memory of the system controller, and/or memory 120. The system controller 116 controls which of the elements 104 are active and the shape of a beam emitted from the probe 106. The system controller 116 is also in electronic communication with the display device 118, and the system controller 116 may process the data (e.g., ultrasound data) into images for display on the display device 118. The system controller 116 may include a central processor (CPU), according to an embodiment. Additionally or alternatively, the system controller 116 may include other electronic components capable of carrying out processing functions, such as a digital signal processor, a field-programmable gate array (FPGA), or a graphic board. In some examples, the system controller 116 may include multiple electronic components capable of carrying out processing functions. For example, the system controller 116 may include two or more electronic components selected from a list of electronic components including: a central processor, a digital signal processor, a field-programmable gate array, and a graphic board. In some examples, the system controller 116 may also include a complex demodulator (not shown) that demodulates the real RF (radio-frequency) data and generates complex data. In another embodiment, the demodulation can be carried out earlier in the processing chain.

The system controller 116 is adapted to perform one or more processing operations according to a plurality of selectable ultrasound modalities on the data. In one example, the data may be processed in real-time during a scanning session as the echo signals are received by receiver 108 and transmitted to system controller 116. For the purposes of this disclosure, the term "real-time" is defined to include a procedure that is performed without any intentional delay. For example, an embodiment may acquire images at a real-time rate of 7-20 frames/sec. The system 100 may acquire 2D data of one or more planes at a significantly faster rate. However, it should be understood that the real-time frame-rate may be dependent on the length of time that it takes to acquire each frame of data for display. Accordingly, when acquiring a relatively large amount of data, the real-time frame-rate may be slower. Thus, some embodiments may have real-time frame-rates that are considerably faster than 20 frames/sec while other embodiments may have real-time frame-rates slower than 7 frames/sec. The data may be stored temporarily in a buffer (e.g., memory 114) during a scanning session and processed in less than real-time in a live or off-line operation. Some examples of the system may include multiple processors to handle the processing tasks that are handled by system controller 116. For example, a first processor may be utilized to demodulate and decimate the RF signal while a second processor may be used to further process the data, for example by augmenting the data, prior to displaying an image. It should be appreciated that other embodiments may use a different arrangement of processors.

The system 100 may continuously acquire data at a frame-rate of, for example, 10 Hz to 30 Hz (e.g., 10 to 30 frames per second). Images generated from the data may be refreshed at a similar frame-rate on display device 118. Other embodiments may acquire and display data at different rates. For example, some embodiments may acquire data at a frame-rate of less than 10 Hz or greater than 30 Hz depending on the size of the frame and the intended application. A memory 120 is included for storing processed frames of acquired data. In some examples, the memory 120 is of sufficient capacity to store at least several seconds' worth of frames of ultrasound data. The frames of data are stored in a manner to facilitate retrieval thereof according to its order or time of acquisition. The memory 120 may comprise any known data storage medium.

The image lines and/or frames are stored in memory and may include timing information indicating a time at which the image lines and/or frames were stored in memory. The modules may include, for example, a scan conversion module to perform scan conversion operations to convert the acquired images from beam space coordinates to display space coordinates. A video processor module may be provided that reads the acquired images from a memory and displays an image in real time while a procedure (e.g., ultrasound imaging) is being performed on a patient. The video processor module may include a separate image memory, and the ultrasound images may be written to the image memory in order to be read and displayed by display device 118.

In various embodiments of the present disclosure, one or more components of system 100 may be included in a portable, handheld ultrasound imaging device. For example, display device 118 and user interface 115 may be integrated into an exterior surface of the handheld ultrasound imaging device, which may further contain system controller 116 and memory 120. Probe 106 may comprise a handheld probe in electronic communication with the handheld ultrasound imaging device to collect raw ultrasound data. Transmit beamformer 101, transmitter 102, receiver 108, and receive beamformer 110 may be included in the same or different portions of the system 100. For example, transmit beamformer 101, transmitter 102, receiver 108, and receive beamformer 110 may be included in the handheld ultrasound imaging device, the probe, and combinations thereof.

After performing a two-dimensional ultrasound scan, a block of data comprising scan lines and their samples is generated. After back-end filters are applied, a process known as scan conversion is performed to transform the two-dimensional data block into a displayable bitmap image with additional scan information such as depths, angles of each scan line, and so on. During scan conversion, an interpolation technique is applied to fill missing holes (e.g., pixels) in the resulting image.

Figure 2:
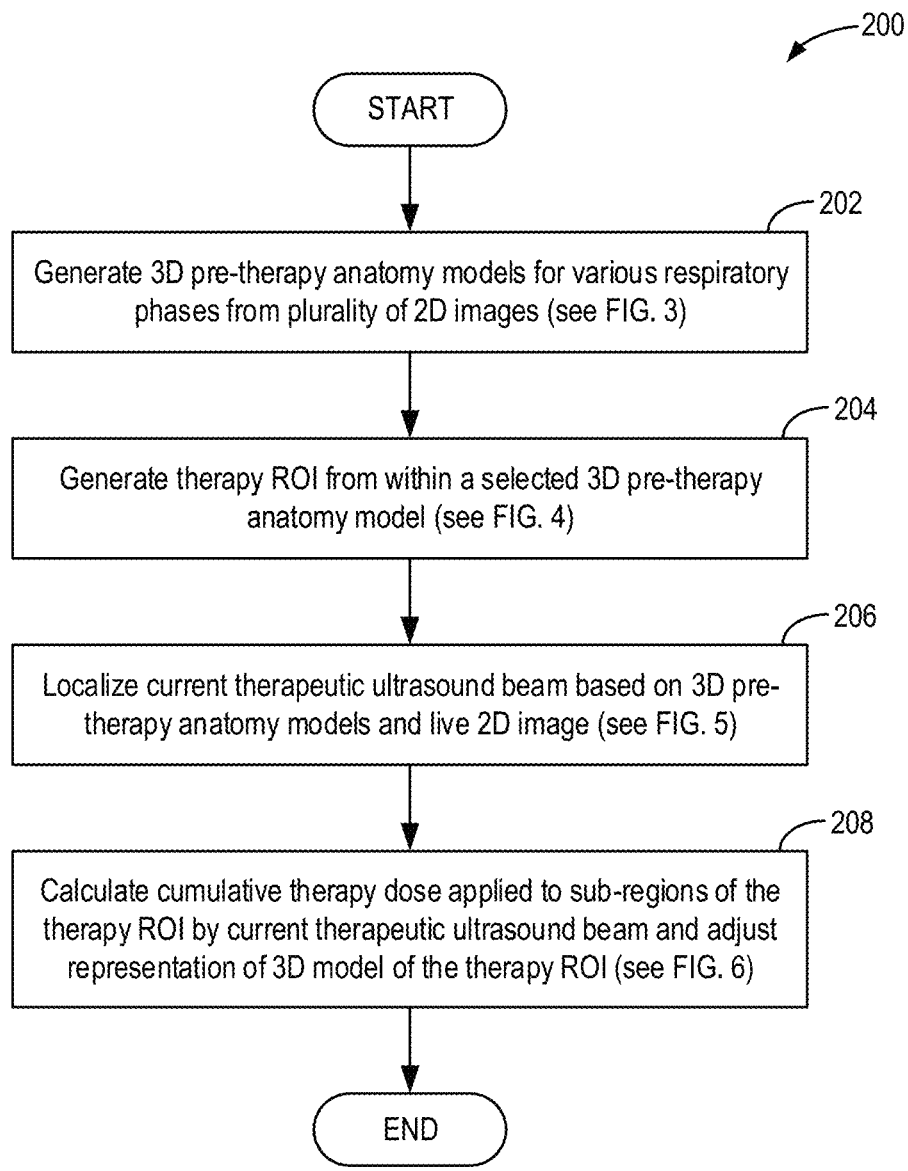
FIG. 2 shows a high-level flowchart illustrating a method for dose accumulation and motion compensation for use with an ultrasound-mediated drug delivery system.

Turning now to FIG. 2, a high-level flowchart illustrating a method 200 for dose accumulation and motion compensation for use with an ultrasound-mediated drug delivery system is shown. The ultrasound-mediated drug delivery system may be the system 100 of FIG. 1. Flowcharts providing further detail of each step of method 200 are provided in methods 300, 400, 500, and 600 of FIGS. 3-6. Instructions for carrying out methods 200, 300, 400, 500, and 600 may be executed by a system controller, such as the system controller 116 of FIG. 1, based on instructions stored in a memory of the controller and in conjunction with signals received from sensors of the imaging system, such as the sensors 107 of FIG. 1.

At 202, method 200 includes generating 3D pre-therapy anatomy models for various respiratory phases from a plurality of 2D images. Further details for generation of the 3D pre-therapy anatomy models is described with reference to method 300 of FIG. 3. In brief, a plurality of 2D images may be acquired by the imaging system for at least two respiratory phases, with a set of 2D images acquired for each of the respiratory phases. A 3D pre-therapy anatomy model may be generated from each set of 2D images.

At 204, method 200 includes generating a therapy ROI from within a selected 3D pre-therapy anatomy model. Further details for generation of the therapy ROI is described with reference to method 400 of FIG. 4. In brief, annotation input to the selected 3D pre-therapy anatomy model may define the therapy ROI, which is a region within the selected 3D pre-therapy anatomy model that is to receive therapeutic ultrasound beams.

At 206, method 200 includes localizing a current therapeutic ultrasound beam based on the 3D pre-therapy anatomy models and a live 2D image. Further details for localization of the position of the current therapeutic ultrasound beam is described with reference to method 500 of FIG. 5. In brief, the location of the current therapeutic ultrasound beam may be determined based on a location of the ultrasound probe when the live 2D image was acquired relative to a known location of the therapy ROI determined from the 3D pre-therapy models. Specifically, each of the 3D pre-therapy anatomy models may be resampled into 2D slices, the live 2D image compared to and matched to one of the 2D slices in order to determine a transformation between the position of the probe when acquiring the live 2D image and the position of the matched 2D slice.

At 208, method 200 includes calculating a cumulative therapeutic ultrasound dose applied to the therapy ROI by the current therapy beam and adjusting a representation of a 3D model of the therapy ROI on a display device (e.g., display device 118 of FIG. 1). Further details for calculating the cumulative therapeutic ultrasound dose and adjusting the representation of the 3D model are described with reference to method 600 of FIG. 6. In brief, a prescribed dose map may be applied to the therapy ROI to determine a threshold or target dose for each sub-region of the therapy ROI and based on position of the current therapeutic ultrasound beam, as determined at 206, doses applied to each sub-region of the therapy ROI are calculated. A displayed color on the display device of each sub-region may be adjusted in response to cumulative doses relative to the threshold/target dose for each sub-region. The method 200 then ends.

Figure 3:
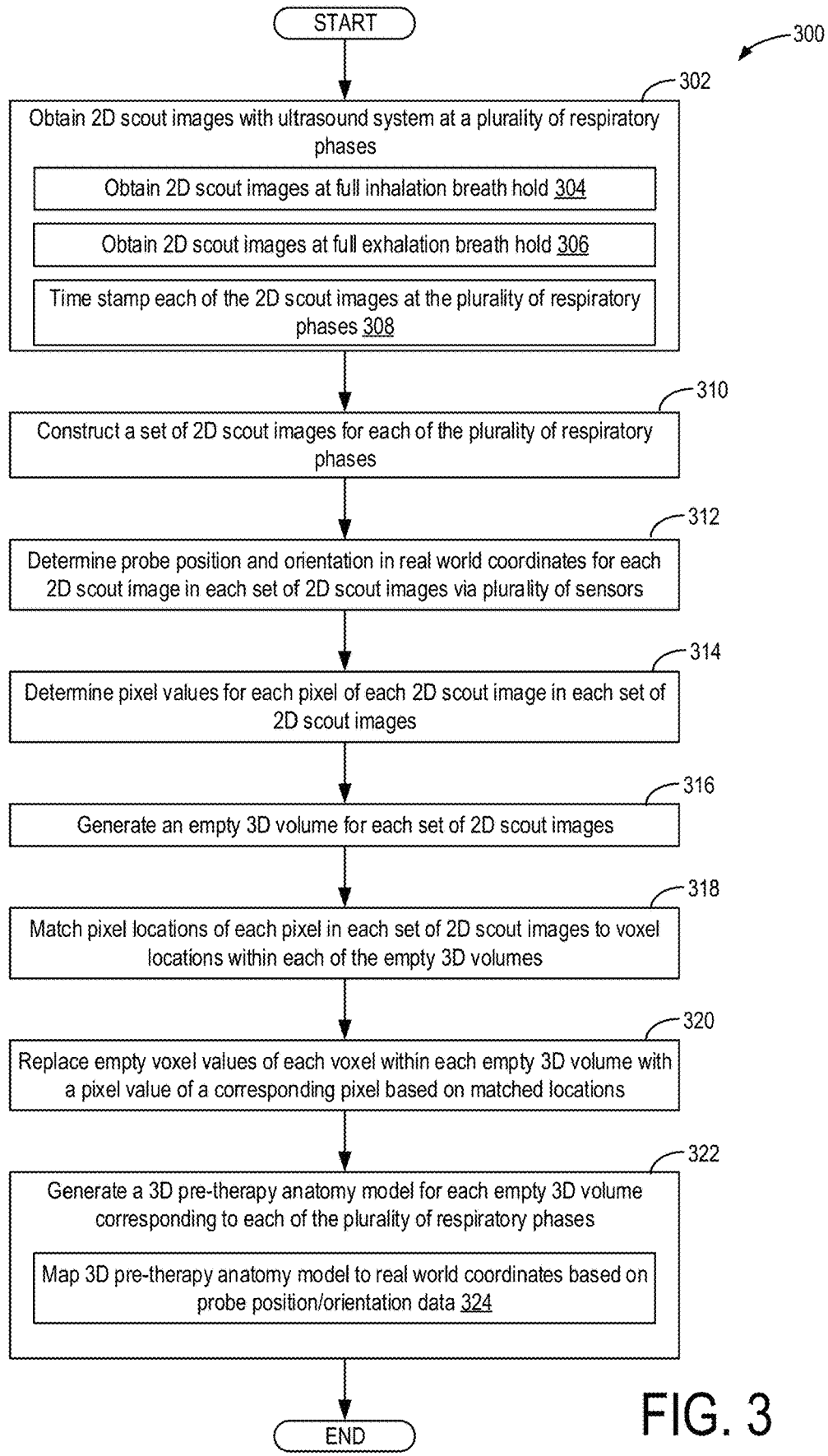
FIG. 3 shows a flowchart illustrating a method for generating 3D pre-therapy anatomy models from 2D scout images.

Referring now to FIG. 3, a flowchart illustrating the method 300 for generating 3D pre-therapy anatomy models for a plurality of respiratory phases is shown. As mentioned, method 300 may be carried out by a controller via computer readable instructions stored in a processor of an imaging system, such as system controller 116 of system 100 of FIG. 1.

At 302, method 300 includes obtaining a plurality of 2D scout images (e.g., 2D images) of a patient with an ultrasound system at a plurality of respiratory phases of the patient. The ultrasound system herein described may be the system 100 of FIG. 1, in some examples. Obtaining 2D scout images at the plurality of respiratory phases may include obtaining 2D scout images at a full inhalation breath hold, as noted at 304, and at a full exhalation breath hold, as noted at 306. In some examples, 2D scout images may be obtained at other respiratory phases, including for example, an inhale, an exhale, a deep inhale, a deep exhale, nominal, and/or the like. Each of the 2D scout images acquired for each of the plurality of respiratory phases may be time stamped, as noted at 308, such that the time at which each 2D scout image was acquired is known to the imaging system. The 2D scout images may be obtained before therapeutic ultrasound beams are delivered to the patient and may be images of the therapy ROI of the patient (e.g., the region of the patient in which the therapy is to be delivered).

At 310, method 300 includes constructing a set of 2D scout images for each of the plurality of respiratory phases. Each of the sets of 2D scout images may define which of the plurality of 2D scout images acquired at 302 are relevant to a particular respiratory phase of the plurality of respiratory phases. For example, a first set of 2D scout images may be obtained while the patient is at a first respiratory phase (e.g., full inhale). An operator of the system 100 may enter an input indicating the respiratory phase and/or indicating commencement of the respiratory phase, and each 2D scout image acquired after the input may be identified as belonging to the indicated respiratory phase. The operator may move the ultrasound probe while acquiring the first set of 2D scout images in order to image the therapy ROI from a variety of angles. The operator may then enter a second input indicating termination of the respiratory phase. The operator may then repeat the process to obtain a second set of 2D scout images for a second respiratory phase (e.g., full exhale).

At 312, method 300 includes determining probe position and orientation in real-world coordinates for each 2D scout image in each set of 2D scout images via one or more position sensors, such as sensors 107 of FIG. 1. The one or more sensors may be included in the probe. Such sensors may be electromagnetic sensors, optical trackers, IMUs, or the like that are configured to localize the probe to real-world coordinates, including orientation of the probe within the real-world coordinates.

At 314, method 300 includes determining pixel values for each pixel of each 2D scout image in each set of 2D scout images. Each pixel within a 2D scout image for a chosen respiratory phase may be assigned a pixel value. The pixel value may be a grayscale pixel value determined based on intensity and/or brightness of the pixel and may be an absolute value based on a predetermined scale or a relative value in relation to surrounding pixels. Each pixel that is assigned a value may have a known position in real-world coordinates as determined at 312 based on position sensor data.

At 316, method 300 includes generating an empty 3D volume for each set of 2D scout images based on position and orientations of 2D scout images of each set of 2D scout images. An empty 3D volume may be generated for each of the plurality of respiratory phases. Generation of empty 3D volumes for each respiratory phase may include determining extents (e.g., boundaries) of the 3D volume based on position and orientation data of the set of 2D scout images. The empty 3D volumes may define a position and orientation of a 3D pre-therapy anatomy model but may not include voxel intensities therein that when visualized depict anatomical structures imaged by the imaging system.

At 318, method 300 includes matching pixel locations of each pixel in each set of 2D scout images to voxel locations within each of the empty 3D volumes. Position and orientation of each 2D scout image may be known based on sensor data and therefore position and orientation data for a corresponding empty 3D volume may be known. Known pixel locations may then be matched to corresponding voxels within each empty 3D volume. Each of the voxels within each empty 3D volume may be empty and therefore may not have an assigned voxel value.

At 320, method 300 includes replacing empty voxel values of each voxel that matches to a pixel location within each empty 3D volume with a pixel value of a corresponding pixel based on matched locations determined at 318. Locations of each of the pixels and voxels may be known in real-world coordinates based on sensor data and a pixel corresponding to each voxel may be determined based on matching locations, as described at 318. Replacing empty voxel values with pixel values may provide a relevant value for each empty voxel based on a determined pixel value, thereby filling the empty 3D volumes with image values at correct locations.

At 322, method 300 includes generating a 3D pre-therapy anatomy model for each empty 3D volume, where each 3D pre-therapy anatomy model corresponds to a respective respiratory phase of the plurality of respiratory phases. Generation of the 3D pre-therapy anatomy models may be based on the 2D scout images and probe position and orientation data as well as voxel values assigned based on matched pixels with specified pixel values. Generation of the 3D pre-therapy anatomy models may be a reconstruction process performed by an anatomy builder module (e.g., anatomy builder module 136 of FIG. 1) that utilizes an algorithm to construct a 3D model from 2D images. The resultant 3D pre-therapy anatomy models may be mapped to real-world coordinates based on probe position and orientation data, as described at 324. As noted at 312, the probe position and orientation is based on real-world coordinates. Data from the sensors that determined the probe position and orientation may also be used to determine position of each 3D pre-therapy anatomy model in real-world coordinates. The resultant 3D pre-therapy anatomy models may be used in a variety of ways, including in methods 400 and 500, as will be further described below. After 324, method 300 ends.

Figure 4:
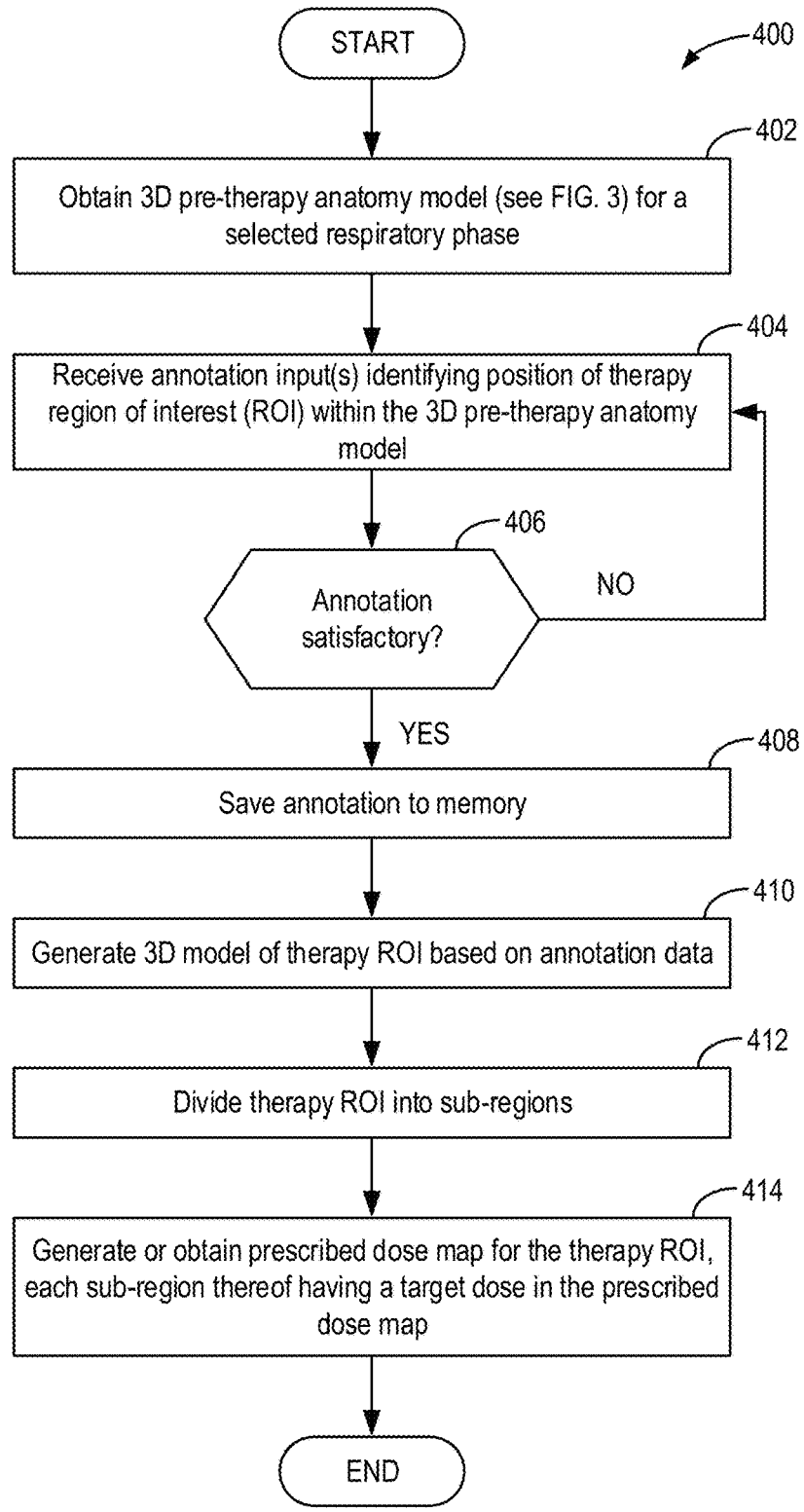
FIG. 4 shows a flowchart illustrating a method for generating a therapy ROI from a 3D pre-therapy model of a selected respiratory phase.

Referring now to FIG. 4, a flowchart illustrating the method 400 for identification of a therapy ROI within a 3D pre-therapy anatomy model for a selected respiratory phase is shown. As mentioned, method 400 may be carried out by at least in part a controller via computer readable instructions stored in a processor of an imaging system, such as system controller 116 of system 100 of FIG. 1.

At 402, method 400 includes obtaining a 3D pre-therapy anatomy model for a selected respiratory phase. The 3D pre-therapy anatomy model may be generated from a set of 2D scout images for the selected respiratory phase, as described with reference to FIG. 3. A position of the 3D pre-therapy anatomy model may be known with real-world coordinates in order to allow for localization of voxels therein. The selected respiratory phase of the 3D pre-therapy anatomy model may be any of the suitable respiratory phases described with reference to FIG. 3, including an inhalation phase or an exhalation phase.

At 404, method 400 includes receiving one or more annotation inputs identifying a position of a therapy ROI within the 3D pre-therapy anatomy model. One or more representations of the 3D pre-therapy model may be displayed on a display device (e.g., projected renderings from one or more views of the 3D pre-therapy model or other renderings of the 3D pre-therapy model) and the annotation inputs may be entered relative to the displayed rendering(s). The one or more annotation inputs may be user inputs received via a user interface (e.g., user interface 123 of FIG. 1), such as a touchscreen touch or mouse click. In such embodiments in which the annotation inputs are user inputs, each user input may define a voxel that is to be included in the therapy ROI. Additionally or alternatively, user inputs may define edges/border of the therapy ROI. Alternatively or additionally, the annotation inputs may be generated by an algorithm programmed in the imaging system.

At 406, method 400 determines whether the annotation provided via one or more annotation inputs at 404 is satisfactory. If the annotation is satisfactory, method 400 proceeds to 408. Otherwise, method 400 returns to 404 to receive additional or new annotation inputs. Determination of whether the annotation is satisfactory may be completed via the user interface whereby a user or operator of the imaging system instructs the imaging system that the annotation is finished. Alternatively, determination that the annotation is satisfactory may be computer generated whereby the imaging system determines that the therapy ROI has been sufficiently captured with the annotation inputs when one or more criteria and/or thresholds have been met. For example, the determination that the annotation is satisfactory may be based on whether the annotation has met and/or exceeded a threshold number of annotation inputs or by other geometrical thresholds such as size or shape of the annotated area.

At 408, method 400 includes saving the annotation to memory. Once completed and determined to be satisfactory, the imaging system, by way of a processor, may save the annotation to memory. Once in memory, the annotation may be used by the imaging system for further actions, such as building a 3D model of the therapy ROI defined by the annotation.

At 410, method 400 includes generating a 3D model of the therapy ROI based on data of the annotation that was saved in memory at 408. Generation of the 3D model may include constructing a cuboid, ellipsoid, or other arbitrary 3D shape that includes the annotated portions of the 3D pre-therapy anatomy model that make up the therapy ROI. In some examples, the constructed 3D shape of the 3D model may correspond to a shape of the therapy ROI such that the 3D model includes an entirety of the therapy ROI while also limiting inclusion of tissues not in the therapy ROI.

In some examples, a representation of the 3D model may be displayed in a graphical user interface (GUI) of the display device on its own, within the 3D pre-therapy anatomy model, or as part of a GUI that includes a live image as well as representations of the probe and a current therapeutic ultrasound beam.

At 412, method 400 includes dividing the therapy ROI into sub-regions. The 3D model of the therapy ROI may comprise a grid of voxels, each voxel representing a respective sub-region of the therapy ROI. In some examples, each voxel in the grid of voxels may be between 0.5 mm$^3$ and 1 cm$^3$. The representation of the 3D model with a representation of the grid of voxels may be displayed in the GUI either on its own or within an outline representing edges of the 3D model.

At 414, method 400 includes generating or obtaining a prescribed dose map for the therapy ROI, each sub-region thereof having a prescribed dose in the prescribed dose map. The prescribed dose map may define a prescribed or target dose (e.g., a threshold level) that may be met, by way of cumulative therapeutic dose for each sub-region, in order for the sub-region to be considered as having reached its prescribed dose. The prescribed dose map may be obtained or loaded from memory based on any of a variety of parameters such as target tissue volume, shape, size, or location. For example, the prescribed dose maps available in memory may be anatomy specific, such that a map for each internal organ, lesion type, etc., is available for use. Alternatively, the prescribed dose map may be generated by the user or operator and may be specific to the therapy ROI in question. The prescribed dose map may be spatially dependent, such that it incorporates position and location of each sub-region within the therapy ROI.

In some examples, the prescribed dose map may be uniform, wherein each of the sub-regions is provided with the same prescription for cumulative therapeutic ultrasound dose (e.g., a target therapeutic ultrasound dose). In other examples, the prescribed dose map may be non-uniform (e.g., weighted). A weighted prescribed dose map may have certain sub-regions with higher threshold levels than other sub-regions based on a variety of parameters that are either pre-set or generated by the user.

It should be understood that while method 400 describes generation of the therapy ROI and 3D model for a single selected respiratory phase based on the 3D pre-therapy anatomy model for that selected respiratory phase, the method 400 may be repeated to generate therapy ROIs and corresponding 3D models for each of the imaged respiratory phases based on the 3D pre-therapy anatomy models for each imaged respiratory phase. As such, a plurality of therapy ROIs may be generated, each corresponding to a specific respiratory phase. The plurality of therapy ROIs may, in some examples, be combined to form a superset therapy ROI that encompasses all the possible positions of the target tissue during the respiratory cycle. Alternatively or additionally, the plurality of therapy ROIs may be kept separate and used as individual units, as will be further described. In such examples in which the plurality of therapy ROIs are kept separate, one of the plurality of therapy ROIs may be defined, either by the user or operator or by an algorithm, as a pre-therapy therapy ROI (e.g., pre-therapy volume) for later use.

For example, in an embodiment in which one or more therapy ROIs for different respiratory phases are combined into a superset therapy ROI that encompasses a spectrum of possible positions of the target tissue, weighting of the prescribed dose map may be determined based on time spent at various positions. For example, voxels of an exhale therapy ROI may be prescribed to receive more dose than voxels of an inhale therapy ROI when more time is spent in an exhale position than an inhale position. Following 414, the method 400 ends.

Figure 5:
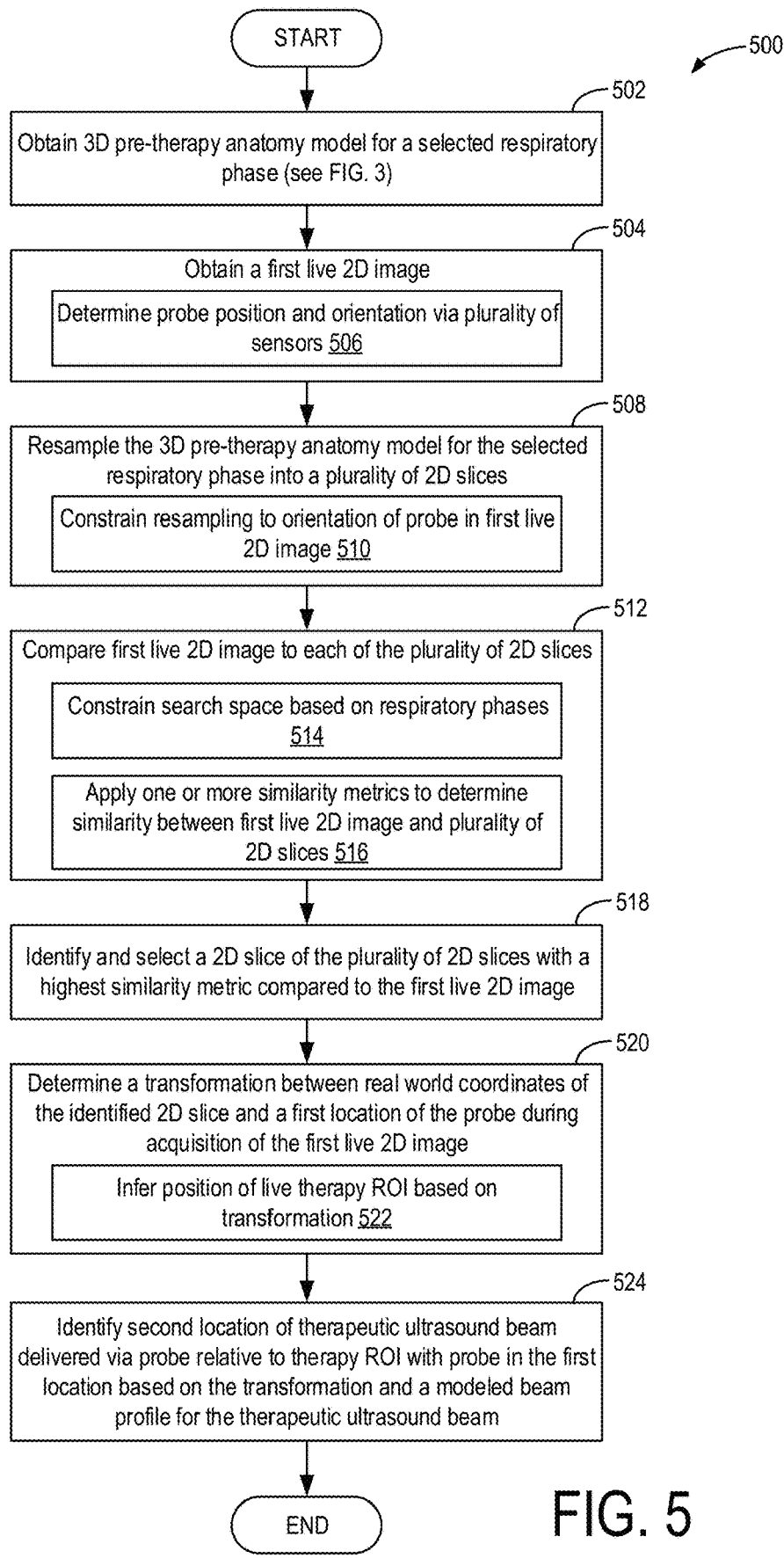
FIG. 5 shows a flowchart illustrating a method for localization of a live therapeutic ultrasound beam.

Referring now to FIG. 5, a flowchart illustrating the method 500 for identifying a location of a therapeutic ultrasound beam based on the 3D pre-therapy anatomy models provided in method 300 and a live 2D ultrasound image is shown. As mentioned, method 500 may be carried out by at least in part a controller via computer readable instructions stored in a processor of an imaging system, such as system controller 116 of system 100 of FIG. 1. Method 500 may be carried out during an ultrasound-mediated therapy session for a patient.

At 502, method 500 includes obtaining a 3D pre-therapy anatomy model for a selected respiratory phase, the 3D pre-therapy anatomy model generated from a set of 2D images as described with reference to FIG. 3. The selected respiratory phase may be any of the respiratory phases for which 3D pre-therapy anatomy models were generated, for example inhalation or exhalation.

At 504, method 500 includes obtaining a first live 2D image with the imaging system, for example with a probe of an ultrasound imaging system such as probe 106. The first live 2D image may be acquired during therapy delivery. For example, the first live 2D image may be acquired at substantially the same time (e.g., immediately before or immediately after) as a therapeutic ultrasound beam is delivered by the probe. In some examples, once the probe is controlled to transmit ultrasound waves and receive echoes from the transmitted ultrasound waves to generate the first live 2D image, the probe may be controlled to transmit the therapeutic ultrasound beam, as described in more detail below. The first live 2D image may ultimately be used to localize the corresponding therapeutic ultrasound beam. The first live 2D image may be obtained in response to a user initiating therapy delivery (e.g., via a user input indicating therapy is to commence). The first live 2D image may include within it viewed structures of a portion of a therapy ROI, the therapy ROI being identified from within the 3D pre-therapy anatomy model as described with reference to FIG. 4. A position and orientation of the probe may be determined by sensors, such as the one or more position sensors 107 of FIG. 1, included in or attached to the probe, as noted at 506. The sensors included in the probe or attached to the probe may determine data of real-world coordinates of the probe when the first live 2D image was acquired, including orientation of the probe.

At 508, method 500 includes resampling the 3D pre-therapy anatomy model for the selected respiratory phase into a plurality of 2D slices. Resampling of the 3D pre-therapy anatomy model may be based on a defined search space, whereby 2D slices to be resampled are determined based on the defined search space. The position of the probe may also be known for each of the 2D slices based on data from the 3D pre-therapy anatomy model, as the 3D pre-therapy anatomy model was generated from 2D images and each of those 2D images corresponds to a probe position and orientation in real-world coordinates, as described with reference to FIG. 3.

Additionally, the 3D pre-therapy anatomy model may be resampled into the plurality of 2D slices based on the orientation of the live 2D image (which in turn may be determined based on the position and orientation of the probe when the live 2D image was acquired), such that the orientation of the 2D slices may be constrained by the orientation of the probe when the first live 2D image was acquired, as noted at 510. Constraining the resampling to the orientation of the probe in the first live 2D image ensures that the 2D slices are in the same orientation as the first live 2D image. For example, the first live 2D image may be from an axial view and thus the 3D pre-therapy anatomy model may be resampled into a plurality of axial 2D slices. In some examples, resampling of the 3D pre-therapy anatomy model may be constrained to orientations within a specified range of the orientation of the probe in the first live 2D image. For example, resampling may be constrained to within +5-10 degrees of the orientation of the probe in the first live 2D image. Providing a range of orientations possible for the resampling may enable a wider search space.

At 512, method 500 includes comparing the first live 2D image to a portion of the plurality of 2D slices or each of the plurality of 2D slices resampled from the 3D pre-therapy anatomy model. Comparing the first live 2D image to each 2D slice may be performed within the defined search space that defines which 2D slices have been resampled. The search space may be constrained based on respiratory phases, as noted at 514. For example, the search space may be constrained to only the 2D slices of a 3D pre-therapy anatomy model for a single respiratory phase. Alternatively, the search space may include 2D slices of more than one 3D pre-therapy anatomy model, for example both an inhalation phase and an exhalation phase, where the search space is defined by the boundary edges of the therapy ROI through a respiratory cycle.

In some examples, a respiration trajectory model of motion may be generated based on the pre-therapy 3D anatomy models obtained at multiple respiratory phases. Each therapy ROI corresponding to a respiratory phase may be mapped using image data and/or sensor data to determine a trajectory of the therapy ROI through the respiratory cycle. In such examples, resampling of 3D pre-therapy anatomy models may be done along the respiration trajectory (constrained by orientation of the probe during live 2D image acquisition, as described above). Thus, resampling of the 3D pre-therapy anatomy models may correspond to the therapy ROI. Additionally, filters for tracking the therapy ROI vs respiratory cycle may be performed in order to constrain the search space to sequential frames, thereby avoiding generating and/or searching irrelevant 2D slices.

In some examples, the first live 2D image may be mapped to a slice of one of the pre-therapy 3D anatomy models (e.g., during inhale or exhale) based on the position and orientation of the probe when the first live 2D image was acquired. The search space of 2D slices of the selected pre-therapy 3D anatomy model may then be created from the selected pre-therapy 3D anatomy model around the mapped slice. For example, the plurality of 2D slices may be generated starting from the mapped slice and extending outward in one or more directions from the mapped slice along the trajectory of the therapy ROI determined as described above.

During comparison between the first live 2D image and each 2D slice, one or more similarity metrics may be determined in order to calculate similarity between the first live 2D image and each 2D slice of the plurality of 2D slices, as noted at 516. For example, a similarity metric may be determined using cross correlation, mutual information, pattern intensity, mean squared error, or structural similarity index. Each comparison (e.g., the first live 2D image to one of the plurality of 2D slices) may result in the calculation of a respective similarity metric, e.g., a value reflective of a degree of similarity between the first live 2D image and that 2D slice.

At 518, method 500 includes identifying and selecting a 2D slice of the plurality of 2D slices with a highest image similarity metric compared to the first live 2D image, relative to the other 2D slices. The selected 2D slice may be defined as the best matching slice for the first live 2D image.

At 520, method 500 includes determining a transformation between real-world coordinates of the selected 2D slice and a first location of the probe during acquisition of the first live 2D image. The transformation may be the displacement of the first location of the first live 2D image compared to the location of the selected 2D slice. The first location of the probe during acquisition of the first live 2D image may be determined by the one or more position sensors of the probe, as described at 506. Based on the first location of the probe, the transformation may be determined. Further, transformation may be in six degrees of freedom including changes of position (e.g., translation) such as surge (e.g., forward/backward), heave (e.g., up/down), and/or sway (e.g., left/right), and changes of orientation/rotation about three perpendicular axes such as yaw (e.g., normal axis), pitch (e.g., transverse axis), and/or roll (e.g., longitudinal axis). Alternatively, transformation may be a displacement in three degrees of freedom.

In examples in which 2D slices of only one of the 3D pre-therapy anatomy models are considered, the determined transformation may be in relation to the respiratory phase of the 3D pre-therapy anatomy model. In examples in which 2D slices of multiple 3D pre-therapy anatomy models are considered, the determined transformation may be in relation to the respiratory phase of the 3D pre-therapy anatomy model from which the selected 2D slice comes from.

A position of a live therapy ROI may be inferred based on the transformation, as noted at 522. The live therapy ROI may refer to a current position and orientation of the therapy ROI (e.g., target ROI) in real-time during a therapy session, as opposed to a pre-therapy therapy ROI, which may have a known position and orientation that are defined prior to a therapy session. For example, the position and orientation of the pre-therapy therapy ROI (e.g., a therapy ROI for the 3D pre-therapy anatomy model) with respect to the selected 2D slice of the 3D pre-therapy anatomy model may be known based on the real-world coordinates of the 3D pre-therapy anatomy model. The transformation provides information for how far the first location of the probe during acquisition of the first live 2D image is from the selected 2D slice. Inference can be made that the position of the live therapy ROI is the same distance from the pre-therapy therapy ROI, thereby providing the location of the live therapy ROI with the probe in the first location.

At 524, method 500 includes identifying a second location of a first therapeutic ultrasound beam delivered via the probe relative to the live therapy ROI with the probe in the first location. The first therapeutic ultrasound beam may be transmitted at substantially the same time as acquisition of the first live 2D image. For example, the first therapeutic ultrasound beam may be transmitted immediately after acquisition of the first live 2D image, such that the user may visualize the first live 2D image via the display device while the first therapeutic ultrasound beam is transmitted. For example, 2D images may be acquired at 7-20 2D images per second. A collection of therapy beams that cover the therapy ROI may be delivered at the same rate (e.g., 7-20 therapy beams per second), or alternatively may be delivered two to four times the rate of image acquisition.

Identification of the second location of the therapeutic ultrasound beam may be based on the transformation, as determined at 520, and a first modeled beam profile for the first therapeutic ultrasound beam. The first modeled beam profile (and other subsequent modeled beam profiles) may be chosen by a user or selected by the imaging system based on parameters such as therapy ROI location (e.g., depth, orientation, etc.) and/or therapy ROI geometry. In some examples, a list of possible modeled beam profiles may be available prior to therapy and the user may select from the list based on parameters of the therapy ROI. The first modeled beam profile, and other modeled beam profiles herein described, may be simulated/modeled based on the user selections or may be a measured beam profile. The first modeled beam profile may provide features for the first therapeutic ultrasound beam, such as the shape of the ultrasound beam, the depth of the ultrasound beam, etc., allowing for the system to determine overlap between the first therapeutic ultrasound beam and the live therapy ROI when the location of both is known. Determining overlap between the first therapeutic ultrasound beam and the live therapy ROI may allow for the system to determine which of a plurality of sub-regions of the live therapy ROI receive the therapeutic ultrasound with the probe in the first location. In some examples, the first modeled beam profile may be used throughout a duration of a therapy session. In other examples, when the first modeled beam profile is system-selected or measured, the first modeled beam profile may be dynamically changed and/or updated based on current location of the therapy ROI and/or geometry of sub-regions of the therapy ROI still demanding additional therapeutic doses. Method 500 then ends.

In subsequent iterations of method 500, wherein a second live 2D image is obtained and compared to a plurality of 2D slices of the 3D pre-therapy anatomy model to identify and select a slice with a highest image similarity metric, a respective location of a second therapeutic ultrasound beam may be determined based on a location of the probe during acquisition of the second live 2D image, a respective modeled beam profile, and a second transformation. For each of a plurality of live 2D images, respective locations of each of a plurality of therapeutic ultrasound beams may be determined as described. The method 500 may be performed substantially in real-time, such that acquisition of a live 2D image occurs at substantially the same time as delivery of a respective therapeutic ultrasound beam. The live 2D image may be acquired with ultrasound signals at a first frequency range and the therapeutic ultrasound beam may include ultrasound signals output at a second frequency range, the second frequency range being different from the first frequency range. This may allow for the user to have real-time feedback of positioning of the probe and therapeutic ultrasound beam with relation to the live therapy ROI as the live therapy ROI moves based on respiration. As such, method 500 allows for respiratory motion compensation.

Methods 200, 300, 400, and 500 provide an example of a method for localizing one or more therapeutic ultrasound beams relative to the therapy ROI to which the therapeutic ultrasound beams are delivered based on one or more images of the therapy ROI acquired with the probe. Other methods for localization are possible in alternative embodiments, however. As an example, rather than obtaining images for multiple respiratory phases, 2D images may be obtained for a specified respiratory phase and the therapy ROI may be located in real-world coordinates with respect to the specified respiratory phase, the specified respiratory phase then used during the therapy session. For example, if the specified respiratory phase is full inhalation, the patient may be asked to fully inhale for the duration of therapy delivery to maintain position of the therapy ROI during treatment. The live 2D image may be localized relative to the therapy ROI by matching to a slice/2D image acquired the full inhale prior to starting the therapy session or the matching may be performed via the probe location data alone. In doing so, the motion compensation described herein may be dispensed with, which may reduce processing resources and computational time but may prolong the overall duration of the therapy session and/or increase patient discomfort.

In other examples, breathing motion compensation may be performed by tracking of the therapy ROI in ultrasound using a computer vision method, which is generally challenging in 2D ultrasound due to motion of the therapy ROI off the 2D plane and does not allow determining the position in 3D world coordinates. As a still further example, real-time registration of live frames may be utilized for the motion compensation, by this method may have higher computation times or demand a trained deep-learning based model.

As another example, a trajectory of motion of the target ROI may be determined in relation to a patient's respiratory cycle, wherein the trajectory is respective of position and time. For example, rather than tracking the position of the ROI at various respiratory phases, the trajectory along which the target ROI moves throughout the respiratory cycle may be determined over time. This trajectory and time since a full inhalation was performed, for example, may then be used to inform cumulative dose calculation whereby the position of the therapy ROI is inferred based on the trajectory and time rather than being localized in real-world coordinates based on 2D slices with sensor data, as is described in the methods above. In other examples, rather than assuming the patient's respiratory cycle is constant, the patient's current respiratory phase may be determined based on a respiration sensor of the patient (e.g., an SpO2 sensor, IMU, position sensor attached to the patient, or other optical-based techniques for determining respiration state) and the position of the therapy ROI determined based on the determined trajectory and current respiratory phase as determined from the sensor. Additional methods for localizing the target ROI during treatment not described herein have been contemplated.

Figure 6:
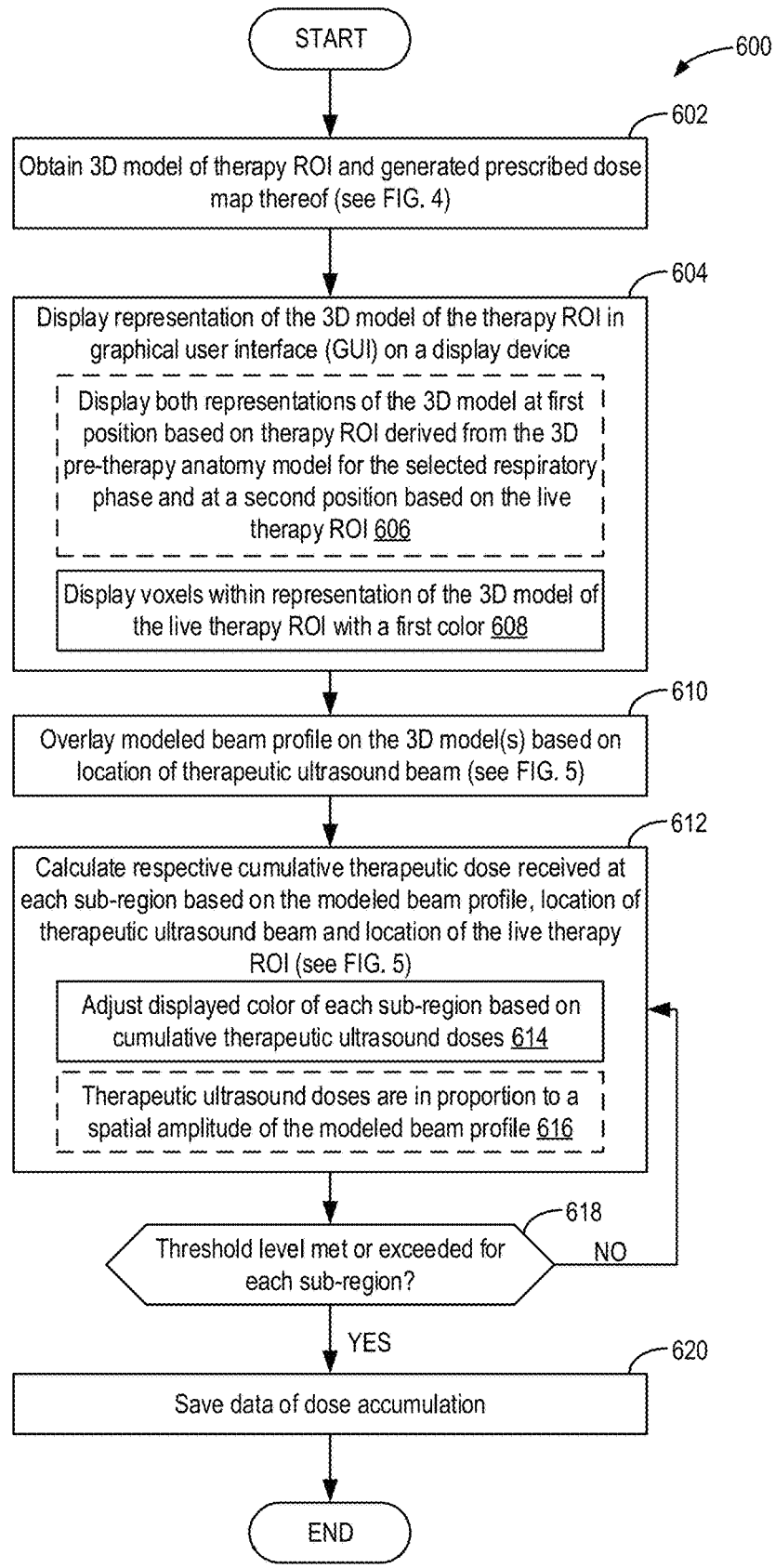
FIG. 6 shows a flowchart illustrating a method for dose accumulation and adjustment of a displayed representation model.

Referring now to FIG. 6, a flowchart illustrating the method 600 for calculating cumulative therapy dose and updating displayed representations of 3D models is shown.

As mentioned, method 600 may be carried out by at least in part a controller via computer readable instructions stored in a processor of an imaging system, such as system controller 116 of system 100 of FIG. 1. Method 600 may be carried out during an ultrasound-mediated therapy session for a patient. Method 600 may provide an example of a method for outputting an indication of calculated cumulative dose, though it should be understood that other methods of outputting such an indication are possible.

At 602, method 600 includes obtaining a 3D model of a therapy ROI and obtaining a generated prescribed dose map of the 3D model of the therapy ROI, the 3D model of the therapy ROI and the prescribed dose map of the 3D model being generated as described with reference to method 400 of FIG. 4. The 3D model may be divided into a plurality of sub-regions, with each sub-region being represented by a voxel within a grid of voxels of the 3D model. The prescribed dose map generated (or obtained from memory) may include a threshold level of therapeutic ultrasound dose (e.g., a target therapeutic ultrasound dose) for each of the sub-regions.

At 604, method 600 includes displaying a representation of the 3D model of the therapy ROI in a GUI on a display device (e.g., display device 118 of FIG. 1). Displaying the representation of the 3D model may include, in some examples, displaying representations of both the 3D model at a first position based on a therapy ROI derived from a 3D pre-therapy anatomy model for a selected respiratory phase (e.g., a pre-therapy therapy ROI) and the 3D model at a second position based on a live therapy ROI, as noted at 606. The 3D model at the first position may be a fixed position with respect to real-world coordinates, as the first position corresponds to a position of the 3D pre-therapy anatomy model for the selected respiratory phase. The second position may vary in real-time as a position of the live therapy ROI changes during a respiratory cycle of the patient.

In some examples, the grid of voxels representative of the plurality of sub-regions of the live therapy ROI may be displayed within the representation of the 3D model for at the second position with a first color, as noted at 608. The first color, such as red, may denote a first stage of cumulative dosage. In some examples the first stage may be a stage prior to dose administration where each sub-region has received no dose. In other examples, the first stage may encompass a range of cumulative doses, for example from 0-25% of the target dose. Thus, all voxels in the grid of voxels may be initialized to the first color.

At 610, method 600 includes overlaying a modeled beam profile on the 3D model(s) based on location of a therapeutic ultrasound beam. As discussed with respect to FIG. 5, the modeled beam profile may be simulated or measured. The respective location of the therapeutic ultrasound beam may be determined as discussed with reference to method 500 of FIG. 5, including determining a transformation between a live 2D image and a selected 2D slice of the 3D pre-therapy anatomy model and using that transformation to determine the location of a probe emitting the therapeutic ultrasound beam, thereby determining the location of the beam. The modeled beam profile, as previously discussed, may be defined by a user or an automated algorithm, chosen from a list, or otherwise selected to provide characteristics (e.g., depth, spatial amplitude specifics, etc.) for the therapeutic ultrasound beam. The overlay of the modeled beam profile may be a representation in the GUI on the display device that visually depicts overlap between the therapeutic ultrasound beam and the live therapy ROI. Being able to visualize overlap between the therapeutic ultrasound beam and the live therapy ROI, including compensation for respiratory motion with real-time adjusted position of the live therapy ROI, may allow the user to avoid applying dose pulses to healthy tissue.

At 612, method 600 includes calculating a respective cumulative therapeutic dose received at each sub-region of the live therapy ROI based on the modeled beam profile, the location of the therapeutic ultrasound beam, and the location of the live therapy ROI. For example, intersection between the modeled beam profile and each of one or more voxels of the 3D model of the live therapy ROI identified as intersecting with the modeled beam profile during administration of a current therapeutic ultrasound dose may lead to adding the current ultrasound dose to a respective prior cumulative therapeutic ultrasound dose for each of the identified one or more voxels. Dose accumulation calculation may be based on time, number of therapy pulses, or accumulated therapy energy.

The displayed color of each of the voxels representative of respective sub-regions may be adjusted based on the determined therapeutic ultrasound dose received at each respective sub-region, as noted at 614. Adjustment of a displayed color for each of the voxels may update the 3D model (e.g., the 3D dose model) based on each respective cumulative therapeutic dose applied. For example, the first color discussed at 608, such as red, may be initially displayed. The displayed color of each voxel may be adjusted to one or more second colors as respective cumulative therapeutic doses received at respective corresponding sub-regions progress toward a respective threshold level (e.g., respective target therapeutic ultrasound dose) determined from the prescribed dose map, the prescribed dose map generated as discussed with reference to FIG. 4. For example, red may be displayed for cumulative doses between 0-25% of the threshold level defined for each sub-region. Orange, as one of the second colors, may be displayed for cumulative doses between 25-50%, for example. Once each sub-region reaches 25%, the displayed color may be adjusted from the first color to one of the second colors.

In some examples, once the respective threshold level is met or surpassed for a respective sub-region, the respective represented colored voxel may be removed from the GUI, indicating that the respective sub-region represented by that voxel has completed its prescribed dose. In alternative examples, a final color, such as green, may be displayed with voxels for one or more corresponding sub-regions that have met and/or exceeded the threshold level. An updated 3D model, including possible examples where voxels either are removed or adjusted to the final color, may allow the user to visualize which sub-regions demand additional doses which may guide the user to move the probe, and therefore adjust the location of the therapeutic ultrasound beam to intersect with the sub-regions that demand additional doses. Similarly, display of the sub-regions that have met and/or exceeded the threshold level may reduce potential for unnecessary additional doses to sub-regions that have already met their respective target therapeutic ultrasound doses. Further, a displayed position of the updated 3D model may be adjusted in real-time, as previously discussed.

As noted, in some examples, the modeled beam profile may include a spatial amplitude, wherein amplitude of the beam differs based on portion of the beam. For example, amplitude, and therefore dose applied, may be higher in the center of the beam and lower towards the edges of the beam. Optionally, at 616, the current therapeutic ultrasound dose applied to each identified sub-region may be in proportion to the spatial amplitude of the modeled beam profile. For example, sub-regions intersecting with the center of the beam may have a higher dose amount added to their cumulative dose than sub-regions intersecting with the edges of the modeled beam profile. Thus, amount of dose received by a sub-region may be based on the modeled beam profile and the transformation that allows for determination of which sub-regions are receiving therapeutic doses for a probe position.

Alternatively, the amount of spatial dose accumulation may be uniformly distributed within a portion of the modeled beam profile that exceeds a threshold. For example, the center of the beam may have a peak amplitude, and any portion of the beam within a specified range of the peak (e.g., 20 dB from peak) may provide a uniform amount of dose to sub-regions intersecting with those portions of the beam. Sub-regions not intersecting with those portions of the beam, including sub-regions that intersect with portions of the beam outside of the specified range, may not accrue a cumulative dose.

At 618, method 600 determines whether each sub-region within the live therapy ROI has met or exceeded the threshold level. If YES, method 600 proceeds to 620. Otherwise, method 600 returns to 612 to continue calculation of cumulative therapeutic doses received at each sub-region given the parameters of the modeled beam profile, the location of the therapeutic ultrasound beam, and the location of the live therapy ROI, including adjustment of the displayed color of each colored voxel based on cumulative dose calculated, as at 614.

When each sub-region within the live therapy ROI has met and/or exceeded the respective threshold levels (accounting for differences in threshold level between sub-regions if defined as such during generation of the prescribed dose map), each sub-region may be displayed in a manner representative of completion. For example, in such an embodiment in which representative voxels are removed once the threshold level is met, each of the voxels of the 3D model may be removed indicating that each of the sub-regions has met or exceeded the threshold level. Alternatively, in such an embodiment in which representative voxels are adjusted to the final color, such as green, upon meeting the threshold level, each voxel may be green indicating that each of the sub-regions has met or exceeded the threshold level.

Additionally, in some examples, a total completion ratio or percentage may be displayed within the GUI as an element, visually indicating to the user approximately how much of the total treatment is completed/yet to be completed. In this way, the user may be able to estimate and communicate to the patient being treated an estimation of duration remaining in the treatment.

At 620, method 600 includes saving data of the dose accumulation to memory once the treatment is determined to be finished. Data of the dose accumulation may include duration of the treatment, number of pulses applied in total, number of doses received by each sub-region, cumulative dose received at each sub-region, and the like. Once therapy is finished, the therapeutic ultrasound beam may be disabled so as to cease administration of therapy. In some examples, the imaging system may output a summary report detailing specifics of the treatment including the parameters included in the data saved to memory. Once saved, the data of the dose accumulation for the treatment may be accessed at a later time for review by the user or by other individuals, such as consulting physicians who may want to review details of the treatment.

Additionally, in some examples, dose accumulation for tissues surrounding the live therapy ROI may be tracked in addition to tracking cumulative doses for sub-regions of the live therapy ROI. This may allow the user to know how much dose was applied to surrounding tissues not intended to be treated.

In alternative examples, therapeutic ultrasound doses may be applied for a set amount of time, the user manually moving the ultrasound probe in order to spread doses around the target tissue as evenly as possible during that set amount of time. In such examples, dose accumulation may occur in a similar fashion, wherein a repeatedly updated 3D model is adjusted based on cumulative doses at each sub-region, though rather than indicating ratio of a target dose, displayed colors may indicate total cumulative dose. This may allow the user to more easily determine which regions may be provided more doses, allowing for an even spread throughout the target tissue.

In some examples, non-periodic patient motion events, such as a body shift, may occur at any point during methods 300, 400, 500, and/or 600. In such examples when a non-periodic patient motion event occurs, a realignment process may be performed in order to reorient locations of therapy ROIs relative to new patient position. The realignment process may include, in some examples, collecting new 3D pre-therapy anatomy models from new scout images. The new 3D pre-therapy anatomy models may then be compared to the prior 3D pre-therapy anatomy models for each respiratory phase in order to determine a transformation between the prior models and the new models. The prescribed dose map and any accumulated doses for respective sub-regions in an accumulation dose map may be transformed and resampled based on the transformation, therefore providing information of dose accumulation relative to the new 3D pre-therapy anatomy models. Slice localization, by way of resampling the new 3D pre-therapy anatomy models into 2D slices and matching a live 2D image to one of the 2D slices based on determined image similarity, may be performed. Dose accumulation is then continued, beginning from the point of the non-periodic patient motion event. Adjustments in this realignment process are possible depending on when the non-periodic patient motion event occurs. In this way, non-periodic motion may be compensated for without unduly interrupting a treatment process, allowing for reduced treatment times and avoiding overtreating of the target tissues.

The method 600 herein described provides an example of a method for outputting an indication of calculated cumulative therapeutic dose to the user via the display device. In additional or alternative embodiments, the indication may be outputted on the display device in various other manners. For example, a progress bar may be displayed on the display device indicating a percentage of the target dose that has been delivered to the therapy ROI; text-based information may be displayed on the display device indicating amount, percentage, and/or the like of the target dose that has been delivered to the entire therapy ROI or a portion of the therapy ROI (e.g., a quadrant of the ROI); and/or text-based instructions may be displayed on the display device indicating a suggested direction of movement of the probe for the user to manually control, the suggested direction of movement being based on calculated cumulative doses at respective sub-regions, wherein a direction of movement is determined based on which sub-regions have reached the target dose and which sub-regions demand additional doses.

Additional methods for indicating and displaying information of the calculated cumulative dose not specified herein have been contemplated.

Figure 7:
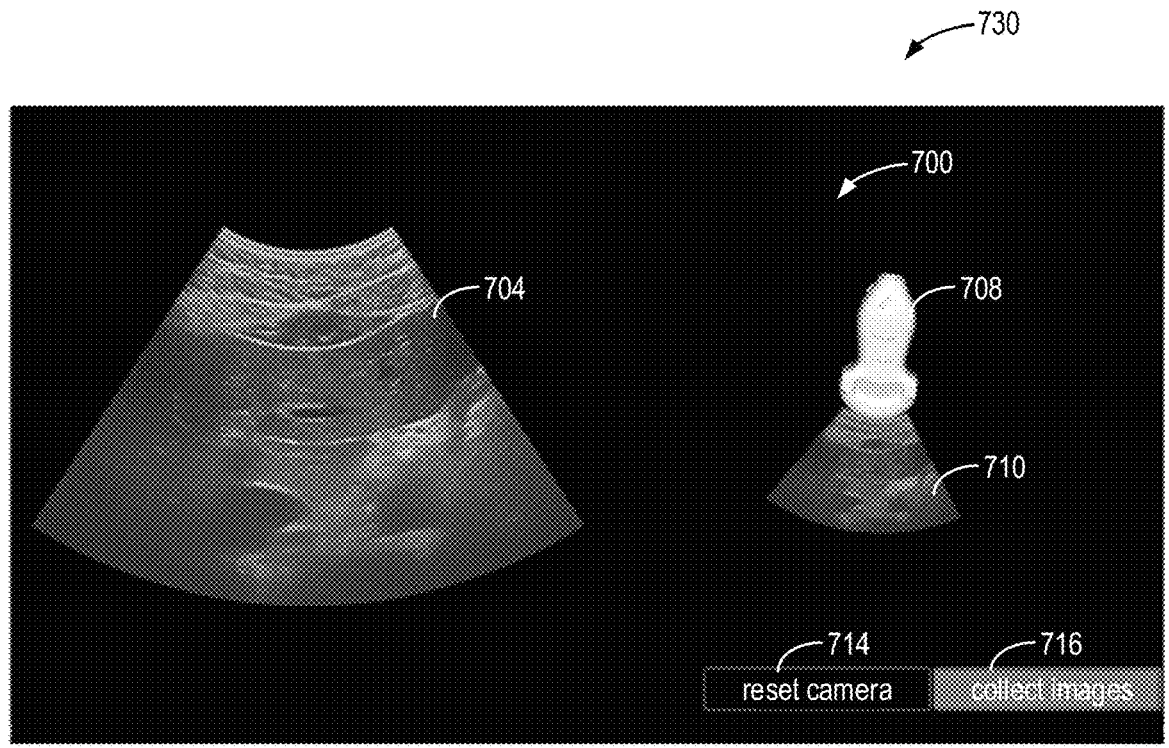
FIG. 7 shows an example graphical user interface (GUI) of an ultrasound system displaying ultrasound images acquired during inhalation and exhalation respiratory phases.
Figure 7:
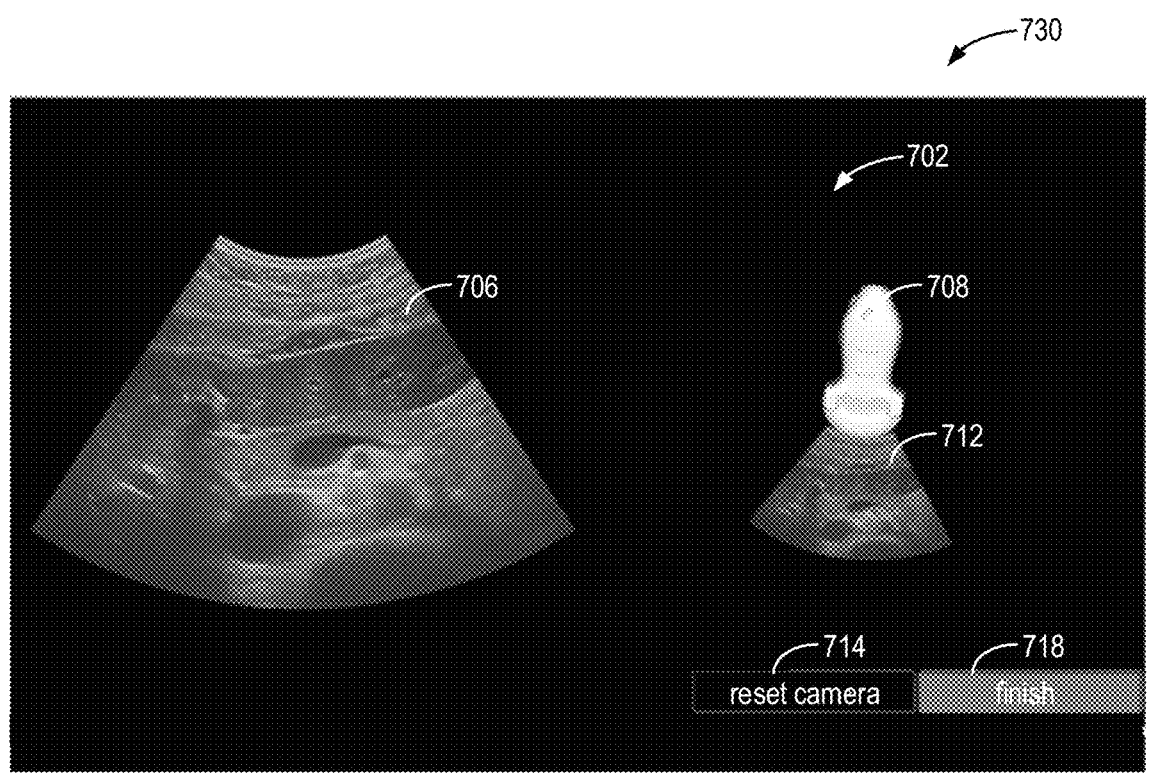

Turning now to FIG. 7, an example GUI 730 displaying images acquired during a first respiratory phase 700 and a second respiratory phase 702 is shown. The GUI 730, in some examples, includes a live 2D ultrasound image, such as live image 704 or live image 706, a representation 708 of a probe, and an image oriented to an orientation of the probe, such as image 710 or image 712. Additionally, the GUI 730 may include a plurality of selectable elements that, when selected, trigger either a resetting or a saving of images collected.

In some examples, a first set of images of the patient, including live image 704, and corresponding first probe location data may be obtained during the first respiratory phase 700 (e.g., an inhalation phase). Subsequently, a second set of images of the patient, including live image 706, and corresponding second probe location data may be obtained during the second respiratory phase 702 (e.g., an exhalation phase).

The live image 704 may be a live image encompassing at least a portion of an ROI targeted for therapy within a patient being imaged at an inhalation breath hold. For example, the patient may inhale and then hold their breath such that images taken may provide a location of the ROI when the patient is at the first respiratory phase 700 of a respiratory cycle. Similarly, the live image 706 may be a live image encompassing at least a portion of the ROI targeted for therapy with the patient being imaged at an exhalation breath hold. For example, the patient may exhale and then hold their breath such that images taken may provide a location of the ROI when the patient is at the second respiratory phase 702 of the respiratory cycle.

The representation 708 of the probe that is included in the GUI 730 may be depicted in an orientation that correlates with the orientation of the probe in real-world coordinates. The image 710 of the first respiratory phase 700 may include structures included in the live image 704. The live image 704 may be shown from the perspective of the probe and thus structures viewed in the live image 704 may not be shown in the orientation in which they are situated in real-world coordinates. Conversely, the image 710 of the first respiratory phase 700 may be orientated to correlate with the orientation of the probe and as such is tilted, rotated, or otherwise shifted to correlate with the orientation of the representation 708 of the probe.

Similarly, the image 712 of the second respiratory phase 702 may include structures included in the live image 706. The live image 706, similar to the live image 704, may be shown from the perspective of the probe. The image 712 of the second respiratory phase 702 may be oriented to correlate with the orientation of the probe and as such is tilted, rotated, or otherwise shifted to correspond with the orientation of the representation 708 of the probe.

The GUI 730 may include selectable element 714 that, when selected, resets the imaging system, thereby restarting the process of obtaining scout images. As discussed with reference to FIG. 3, 2D scout images are obtained in order to reconstruct one or more volumetric anatomy models at a plurality of respiratory phases. If a user deems scout images obtained to not be satisfactory, the selectable element 714 may be selected in order to restart the process to obtain new scout images.

The GUI 730 may, in some examples, include a selectable element 716 that, when selected, initiates collection of scout images for the first respiratory phase 700. The GUI 730, in some examples, may include a selectable element 718 that, when selected, finishes the collection of scout images for the first respiratory phase 700. Selectable element 718 may be included in the GUI 730 following selection of selectable element 716. In some examples, after selection of the selectable element 718, GUI 730 may return to an initial presentation including the selectable element 716, which when selected may initiate collection of scout images for the second respiratory phase 702. In some examples, after selection of the selectable element 718, a subsequent GUI may replace GUI 730, showing, for example, one or more volumetric anatomy models generated from the obtained scout images.

Figure 8:
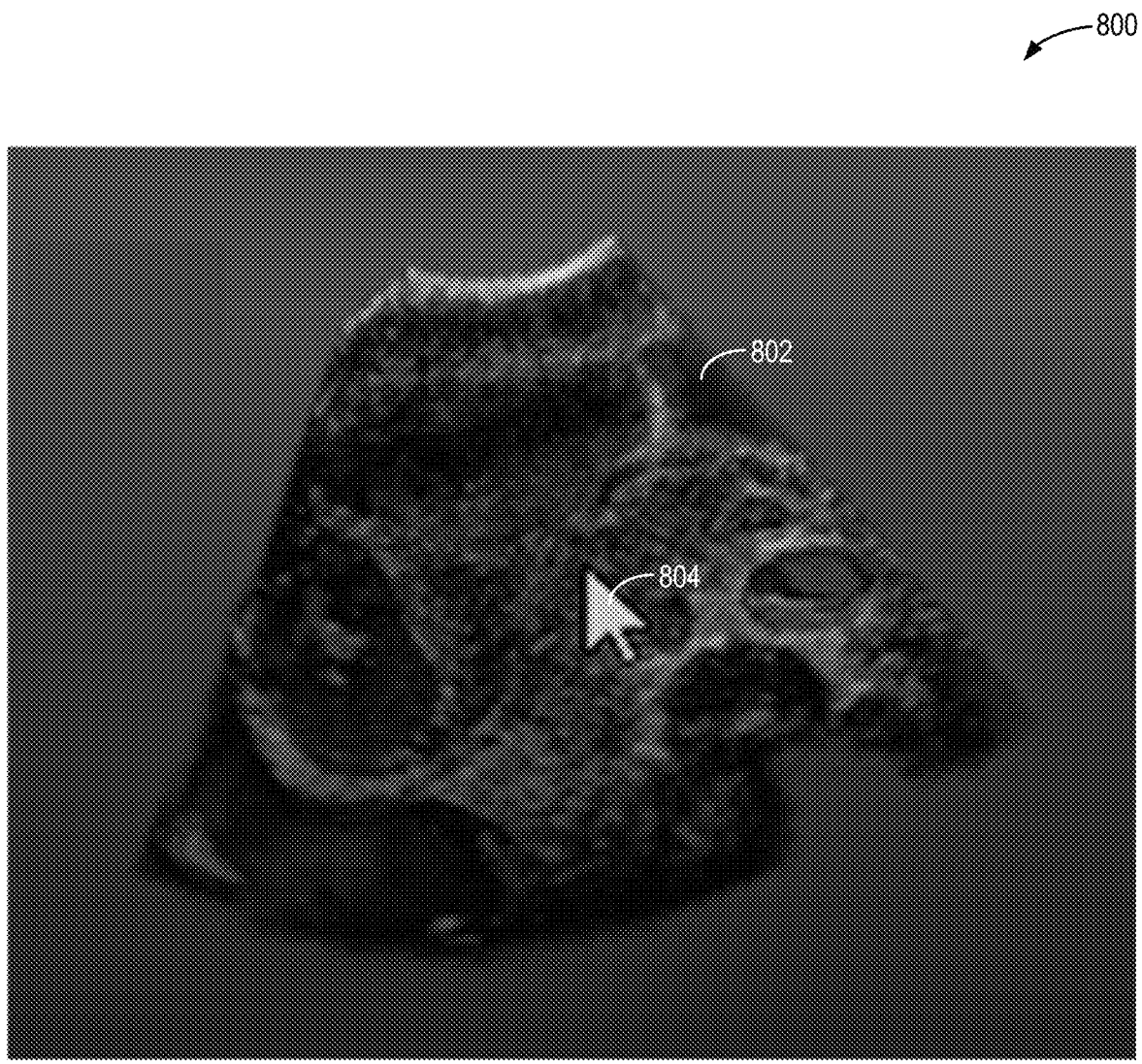
FIG. 8 shows an example 3D pre-therapy anatomy model.

Referring now to FIG. 8, a representation of a 3D pre-therapy anatomy model 802 (e.g., a volumetric anatomy model) is depicted. The 3D pre-therapy anatomy model 802 may be displayed within a GUI 800 of a display device, such as display device 118 of FIG. 1. The 3D pre-therapy anatomy model 802 may be reconstructed from a set of 2D scout images, such as a set including live image 704 of FIG. 7, the set of 2D scout images being specific to a selected respiratory phase, such as the first respiratory phase 700 of FIG. 7 in some examples. The 3D pre-therapy anatomy model 802 may thus be specific to the particular respiratory phase. Therefore, a plurality of volumetric anatomy models may be generated, each of the plurality of volumetric anatomy models corresponding to a set of scout images for a respiratory phase.

A user may utilize a cursor 804 in order to change a viewed perspective of the 3D pre-therapy anatomy model 802. This may allow the user to view all aspects of the 3D pre-therapy anatomy model 802 in a 2D space of the GUI 800. In this way, the user may have a fuller understanding of anatomy present in the 3D pre-therapy anatomy model 802, which the user may then use when annotating the 3D pre-therapy anatomy model 802 in order to identify and define an ROI targeted for therapy.

Figure 9:
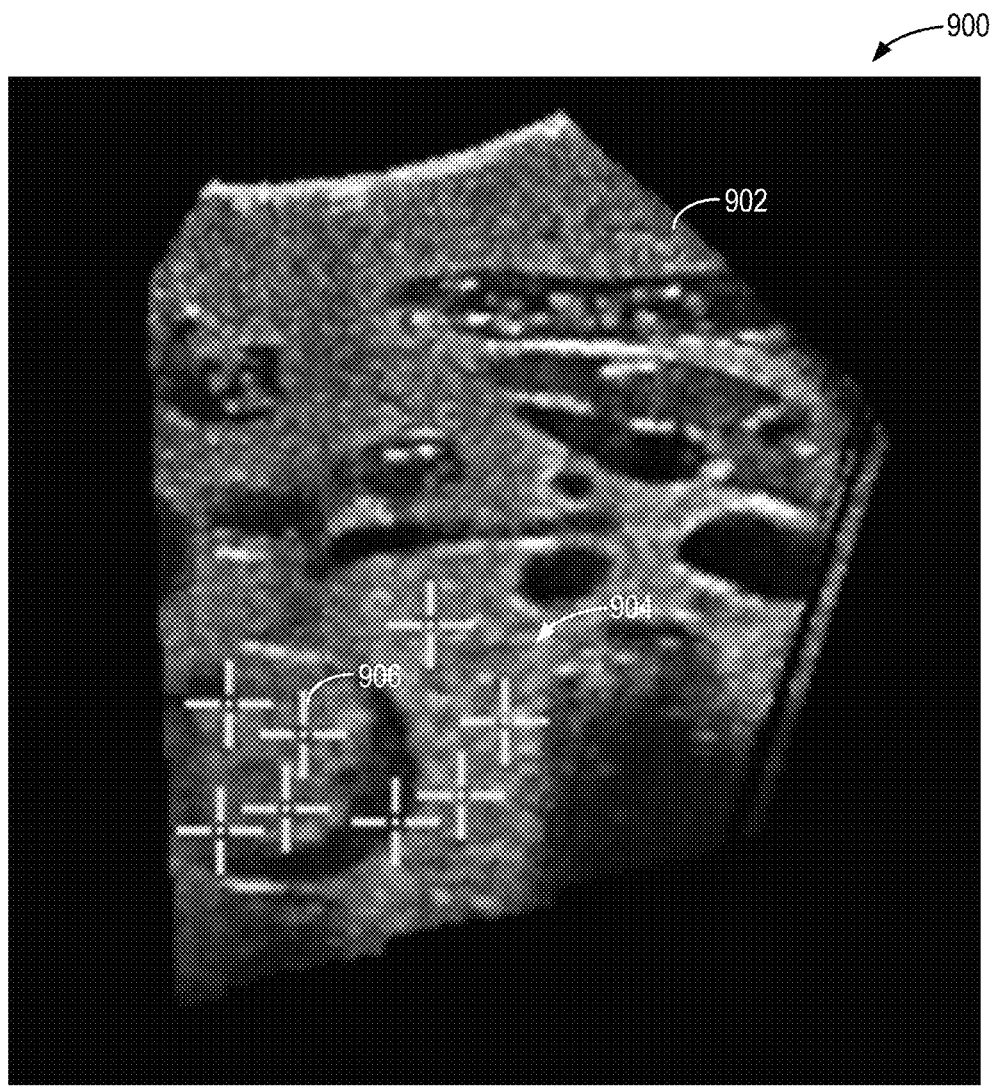
FIG. 9 shows an example annotation of a 3D pre-therapy anatomy model.

Turning now to FIG. 9, an example GUI 900 that may be displayed during annotation of a 3D pre-therapy anatomy model 902 is shown. The 3D pre-therapy anatomy model 902 may be, in some examples, the 3D pre-therapy anatomy model 802, generated from a set of scout images specific to a selected respiratory phase, for example an inhalation phase.

As described with reference to method 400 of FIG. 4, one or more annotation inputs 904 may indicate the location of a target ROI (e.g., a therapy ROI). Each annotation input, such as annotation input 906, may be inputted by a user or, in some examples, by an algorithm executed by a processor. The one or more annotation inputs 904 may indicate an outer boundary of the region of the 3D pre-therapy anatomy model 902 that is to be included in the target ROI. The one or more annotation inputs 904, such as annotation input 906, may be added to the GUI via user inputs, such as a mouse click. The one or more annotation inputs 904 may be added to one or more 2D slices of the 3D pre-therapy anatomy model to define a 3D region to be included in the target ROI. The one or more annotation inputs 904 together may define the outer boundary of the target ROI. In some examples, annotation inputs entered on one of the 2D slices may be visible on other 2D slices (e.g., other viewing planes of the 3D pre-therapy anatomy model). Each of the one or more annotation inputs 904 may define the boundary of the target ROI, such that a resultant 3D model of the target ROI encompasses a target anatomy while avoiding tissue that surrounds the target anatomy, the surrounding tissue not intended to be treated by the ultrasound-mediated drug delivery system.

Similar to GUI 730 of FIG. 7, the GUI 900 may, in some examples, include selectable elements (not shown), that when selected, either save the annotation to trigger generation of the 3D model of the target ROI or reset the annotation to restart the annotation process. Additionally, the GUI 900 may include a selectable element to redo scout images that were used to generate the 3D pre-therapy anatomy model 902 if a user determines that the 3D pre-therapy anatomy model is not adequate, for example if the 3D pre-therapy anatomy model does not fully encompass the intended target ROI. Additionally, in some examples, the GUI 900 may also include multiple views of the 3D pre-therapy anatomy model 902 as well as an estimation of the target ROI defined by the annotation inputs.

Figure 10:
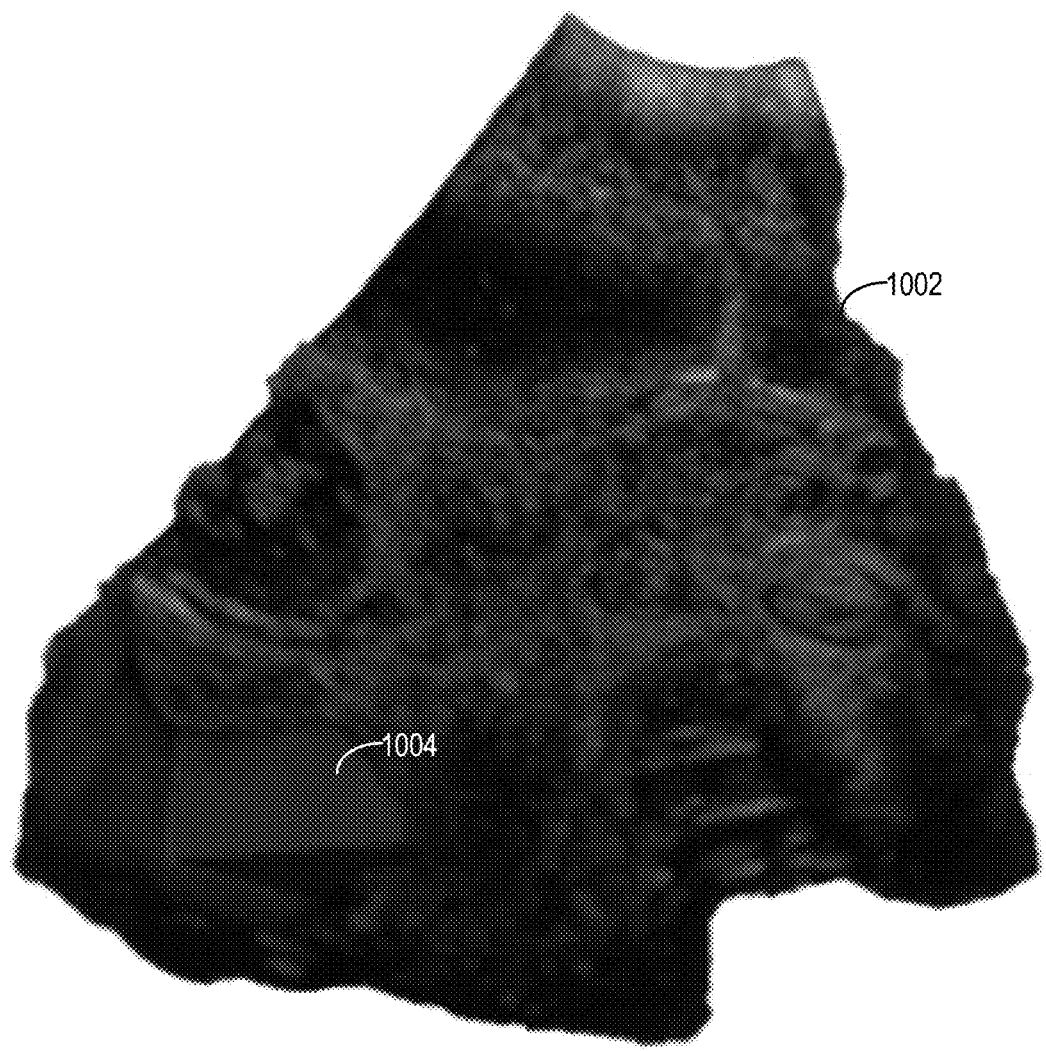
FIG. 10 shows an example 3D model of a therapy region of interest (ROI) within a 3D pre-therapy anatomy model.

Referring now to FIG. 10, an example of a displayed representation of a 3D pre-therapy anatomy model 1002 is shown. Within the 3D pre-therapy anatomy model 1002 is a 3D model 1004 of a target ROI (e.g., therapy ROI). The 3D model 1004 may be in a form of a suitable 3D arbitrary shape, such as a cuboid shape or ellipsoid shape. 3D model 1004 is depicted in FIG. 10 as a cuboid shape.

In the example shown, the 3D model 1004 may be displayed with a color, such as red, that is different than the surrounding 3D pre-therapy anatomy model 1002. This may allow a user to more easily differentiate the target ROI and 3D model 1004 of the target ROI from the surrounding tissues. Similar to the cursor 804 of FIG. 8, the GUI in which the 3D model 1004 is displayed may also include a cursor (not shown) that allows the user to change a viewed perspective view of the 3D pre-therapy anatomy model 1002 to view the 3D pre-therapy anatomy model 1002 and the 3D model 1004 of the target ROI from a variety of perspectives and orientations.

It should be understood that while a single volumetric anatomy model is depicted in each of FIGS. 8-10, at least two 3D pre-therapy anatomy models may be reconstructed, annotated, and displayed via a representation of a 3D model of the target ROI for respective respiratory phases. Once a first volumetric anatomy model is annotated and a first 3D model generated noting a first location of the target ROI for a first respiratory phase, a second volumetric anatomy model may be annotated and a second 3D model generated noting a second location of the target ROI for a second respiratory phase.

Figure 11A:
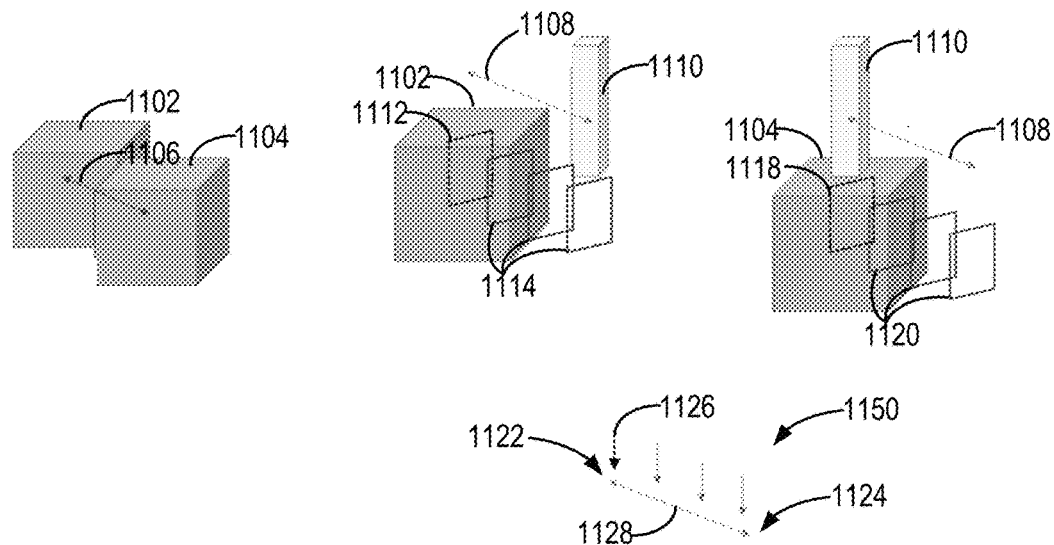
FIG. 11A schematically illustrates localization of a live 2D image for a first probe position.
Figure 11B:
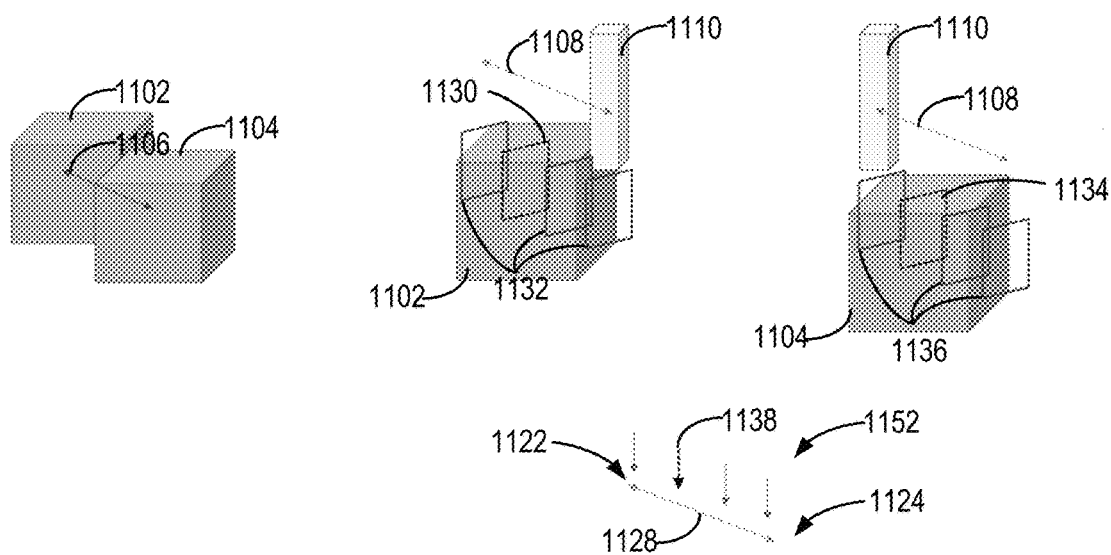
FIG. 11B schematically illustrates localization of a live 2D image for a second probe position.
Figure 11C:
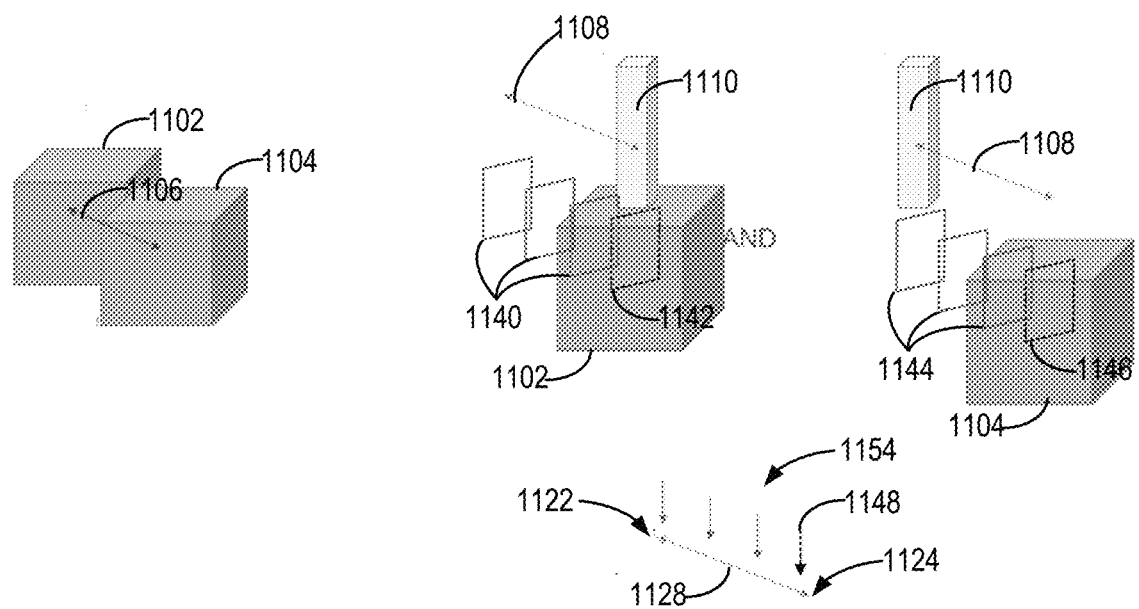
FIG. 11C schematically illustrates localization of a live 2D image for a third probe position.

Referring now to FIG. 11A-11C, diagrams illustrating determination of transformation for motion compensation are shown for various probe positions. FIG. 11A specifically shows a transformation with a probe 1110 in a first position. FIG. 11B specifically shows a transformation with the probe 1110 in a second position. FIG. 11C specifically shows a transformation with the probe 1110 in a third position. The first, second, and third positions of the probe 1110 may be based in relation to a position of a first therapy ROI 1102 of a first volumetric anatomy model (e.g., a 3D pre-therapy anatomy model for an inhalation phase) and/or a position of a second therapy ROI 1104 of a second volumetric anatomy model (e.g., a 3D pre-therapy anatomy model for an exhalation phase). While two therapy ROIs are shown in FIGS. 11A-11C, more or less therapy ROIs may be used for slice localization. Determining the transformation may allow for determining a position of a portion of an ROI in a live 2D image obtained via the probe 1110 relative to a position of a corresponding portion of the ROI in the first volumetric anatomy model or the second volumetric anatomy model, as will be further described.

In FIGS. 11A-11C, a search space 1106 is shown in relation to the position of the first therapy ROI 1102 and the position of the second therapy ROI 1104. The first therapy ROI 1102 and the second therapy ROI 1104 may include the same anatomical structures or features therein, though each is from a different pre-therapy 3D anatomy model for a respective respiratory phase, as discussed. The search space 1106 may define a set of transformations relative to the current probe position and orientation defining which 2D slices of each of the first and second pre-therapy 3D anatomy models are sampled and compared to a live 2D image. As described with respect to FIG. 5, each of the first and second pre-therapy 3D anatomy models may be resampled into a plurality of 2D slices. The slices to be resampled may be determined by the search space 1106. In some examples, the resampling may be constrained to an orientation of the probe 1110 during acquisition of the live 2D image or a specified range of orientations based on the orientation of the probe 1110 during acquisition of the live 2D image for optimal comparison. While the slices depicted in FIGS. 11A-11C are shown in a parallel stack, in some examples, the slices may overlap and/or cross as a result of the images having differing orientations (e.g., being obtained at different probe orientations) and/or as a result of the breathing motion trajectory defining the search space being non-linear. The search space 1106 may thus define the location and orientation of the 2D slices that are to be compared to the live 2D image based on location and/or orientation of each of the 2D slices, wherein 2D slices that lie within the search space are sampled for comparison.

FIG. 11A depicts the probe 1110 in the first position, the first position being further away from the position of the first therapy ROI 1102 than from the position of the second therapy ROI 1104. A first plurality of 2D slices, such as first 2D slice 1112 and additional 2D slices 1114, are shown within a first search space 1108 defining the 2D slices generated from the first pre-therapy anatomy model (e.g., obtained at inhalation) and considered for comparison with a first live 2D image acquired with the probe in the first position. A second plurality of 2D slices, such as second 2D slice 1118 and additional 2D slices 1120, are also shown within the first search space 1108 defining the 2D slices generated from the second pre-therapy anatomy model (e.g., obtained at exhalation) and considered for comparison with the first live 2D image acquired with the probe in the first position.

The first plurality of 2D slices, the second plurality of 2D slices, or both pluralities of 2D slices may be compared with the first live 2D image to determine which slice best matches the first live 2D image. The first 2D slice 1112 may be identified following comparison between the first live 2D image acquired with the probe 1110 and each of the 2D slices within the first search space 1108, as is further described with respect to method 500 of FIG. 5. The first 2D slice 1112 may be identified as the 2D slice of the first plurality of 2D slices with the highest image similarity metric, the similarity metrics determined based on each of the comparisons.

Similarly, the second 2D slice 1118 may be identified by comparison between the first live 2D image acquired with the probe 1110 and each of the second plurality of 2D slices within the first search space 1108. In some examples, the first 2D slice 1112 within the first search space 1108 may be a different slice than the second 2D slice 1118 within the first search space 1108. In other examples, the first 2D slice 1112 may be the same 2D slice as the second 2D slice 1118, depending on the 2D slices included in the first search space 1108. As appreciated from FIG. 11A, the first live 2D image matches a slice that is present in the first therapy ROI 1102 and a slice that is present in the second therapy ROI 1104. The position of the probe 1110 relative to the position of the slice in the first therapy ROI 1102 and/or relative to the position of the slice in the second therapy ROI 1104 may be used to determine where the probe is located relative to the live therapy ROI (e.g., the position of the therapy ROI in the patient at the time the first live 2D image was acquired), as explained below.

Based on the first position of the probe 1110 and the position of the matched, first 2D slice 1112, a transformation may be calculated (e.g., in 3 DOF or 6 DOF) of a portion of the therapy ROI in the first live 2D image relative to a position of a corresponding portion of the first therapy ROI 1102 in the first pre-therapy 3D anatomy model. Similarly, based on the first position of the probe 1110 and the matched, second 2D slice 1118, a transformation may be calculated of the portion of the therapy ROI in the first live 2D image relative to the position of the second therapy ROI 1104 in the second pre-therapy 3D anatomy model. The positions of the probe 1110, the matched 2D slices 1112, 1118 (and other matched 2D slices discussed herein for FIGS. 11B and 11C), and the therapy ROIs 1102, 1104 may be known to the imaging system via sensors included in the probe 1110 that collect data of positions and orientations in real-world coordinates.

FIG. 11A further includes a diagram 1150 of current displacement of the first live 2D image relative to the position of the first therapy ROI 1102. A position 1122 of the second therapy ROI 1104 is shown on a side of a search space 1128 opposite from a position 1124 of the first therapy ROI 1102. The search space 1128 may define a position and/or orientation of the live 2D image relative to the therapy ROIs 1102, 1104. A position 1126 of the first live 2D image acquired by the probe 1110 is shown relative to the positions 1122, 1124 of the therapy ROIs 1104, 1102, respectively. Thus, a position of the live therapy ROI can be inferred based on the transformation described above. For the first position of the probe 1110 depicted in FIG. 11A, the position 1126 of the first live 2D image may be considered maximally displaced (e.g., fully displaced) relative to the position 1124 of the first therapy ROI 1102 as the position 1126 of the first live 2D image is substantially equal to the position 1122 of the second therapy ROI 1104 and the second therapy ROI 1104 is at an opposite side of the search space 1128 compared to the therapy ROI 1102. In this way, by identifying a matching slice from a resampled 3D pre-therapy anatomy model (where the position of the therapy ROI is known), the current position of the therapy ROI relative to the probe may be determined, which may then be used (along with the modeled or measured beam profile of the therapy beam emitted by the probe) to determine which sub-regions of the therapy ROI in the patient have or will receive a dose of therapeutic ultrasound.

FIG. 11B depicts the probe 1110 in the second position, the second position being some distance between the position of the first therapy ROI 1102 and the position of the second therapy ROI 1104. A third plurality of 2D slices, such as third 2D slice 1130 and additional 2D slices 1132, are shown within the first search space 1108 defining the 2D slices generated from the first pre-therapy anatomy model and considered for comparison with a second live 2D image acquired with the probe 1110 in the second position. A fourth plurality of 2D slices, such as fourth 2D slice 1134 and additional 2D slices 1136, are also shown with the first search space 1108 defining the 2D slices generated from the second pre-therapy anatomy model and considered for comparison with the second live 2D image acquired with the probe in the second position. The additional 2D slices 1132, 1136 may be different from the additional 2D slices 1114, 1120 of FIG. 11A as the position and orientation of the 2D slices 1132, 1136 may be based on the second position of the probe 1110, whereas the additional 2D slices 1114, 1120 are based on the first position of the probe 1110.

Similar to FIG. 11A, the third plurality of 2D slices, the fourth plurality of 2D slices, or both pluralities of 2D slices may be compared with the second live 2D image to determine which slice best matches the second live 2D image. The third 2D slice 1130 may be identified following comparison between the second live 2D image acquired with the probe 1110 and each of the third plurality of 2D slices within the first search space 1108 for the second position of the probe 1110. The third 2D slice 1130 may be identified as the 2D slice with the highest image similarity metric, as described above.

Similarly, the fourth 2D slice 1134 may be identified following comparison between the second live 2D image acquired with the probe 1110 and each of the fourth plurality of 2D slices within the first search space 1108 for the second position of the probe 1110. In some examples, the third 2D slice 1130 within the first search space 1108 may be a different slice than the fourth 2D slice 1134 within the first search space 1108. In other examples, the third 2D slice 1130 may be the same 2D slice as the fourth 2D slice 1134, depending on the 2D slices included in the first search space 1108.

As appreciated from FIG. 11B, the second live 2D image matches a slice that is present in the first therapy ROI 1102 and a slice that is present in the second therapy ROI 1104. The position of the probe 1110 relative to the position of the slice in the first therapy ROI 1102 and/or relative to the position of the slice in the second therapy ROI 1104 may be used to determine where the probe is located relative to the live therapy ROI (e.g., the position of the therapy ROI in the patient at the time the second live 2D image was acquired), as explained below.

Based on the second position of the probe 1110 and the position of the matched, third 2D slice 1130, a transformation may be calculated of a portion of the therapy ROI in the second live 2D image relative to the position of a corresponding portion of the first therapy ROI 1102 of the first 3D pre-therapy anatomy model. Similarly, based on the second position of the probe 1110 and the matched, fourth 2D slice 1134, a transformation may be calculated of the portion of the therapy ROI in the second live 2D image relative to the position of the first therapy ROI 1104 in the second 3D pre-therapy anatomy model.

FIG. 11B further includes a diagram 1152 of current displacement of the second live 2D image relative to the position of the first therapy ROI 1102. The position 1122 of the second therapy ROI 1104 is again shown on the side of the search space 1128 opposite from the position 1124 of the first therapy ROI 1102. The search space 1128 may define a position and/or orientation of the second live 2D image relative to the therapy ROIs 1102, 1104. A position 1138 of the second live 2D image acquired by the probe 1110 is shown relative to the positions 1122, 1124 of the therapy ROIs 1104, 1102, respectively. Thus, a position of the live therapy ROI with the probe 1110 in the second position can be inferred based on the transformation, as described above.

For the second position of the probe 1110 depicted in FIG. 11B, the position 1138 of the second live 2D image may be considered partially displaced relative to the position 1124 of the first therapy ROI 1102 as the position 1138 of the second live 2D image is at some position between the position 1122 of the second therapy ROI 1104 and the position 1124 of the first therapy ROI 1102. In this way, by identifying a matching slice from a resampled 3D pre-therapy anatomy model (where the position of the therapy ROI is known), the current position of the therapy ROI relative to the probe may be determined, which may then be used (along with the modeled beam profile of the therapy beam emitted by the probe) to determine which sub-regions of the therapy ROI in the patient have or will receive a dose of therapeutic ultrasound.

FIG. 11C depicts the probe 1110 in the third position, the third position being closer to the position of the first therapy ROI 1102 than the position of the second therapy ROI 1104. A fifth plurality of 2D slices, such as fifth 2D slice 1142 and additional 2D slices 1140, are shown within the first search space 1108 defining the 2D slices generated from the first pre-therapy anatomy model and considered for comparison with a third live 2D image acquired with the probe 1110 in the third position. A sixth plurality of 2D slices, such as sixth 2D slice 1146 and additional 2D slices 1144, are shown within the first search space 1108 defining the 2D slices generated from the second pre-therapy anatomy model and considered for comparison with the third live 2D image acquired with the probe in the third position. The additional 2D slices 1140, 1144 may be different from the 2D slices 1114, 1120, 1132, 1136 of FIGS. 11A and 11B as the position of additional 2D slices 1140, 1144 may be based on the third position of the probe 1110, whereas the 2D slices 1114, 1120 and the 2D slices 1132, 1136 are based on the first and second positions of the probe 1110, respectively.

The fifth plurality of 2D slices, the sixth plurality of 2D slices, or both pluralities of 2D slices may be compared with the third live 2D image to determine which slice best matches the third live 2D image. The fifth slice 1142 may be identified following comparison between the third live 2D image acquired with the probe 1110 and each of the fifth plurality of 2D slices within the first search space 1108 for the third position of the probe 1110. The fifth 2D slice 1142 may be identified as the 2D slice with the highest image similarity metric, as described above.

Similarly, the sixth 2D slice 1146 may be identified following comparison between the third live 2D image acquired with the probe 1110 and each of the sixth plurality of 2D slices within the first search space 1108. In some examples, the fifth 2D slice 1142 within the first search space 1108 may be a different slice than the sixth 2D slice 1146 within the first search space 1108. In other examples, the fifth 2D slice 1142 may be the same 2D slice as the sixth 2D slice 1146, depending on the 2D slices included in the first search space 11086. As appreciated from FIG. 11C, the third live 2D image matches a slice that is present in the first therapy ROI 1102 and a slice that is present in the second therapy ROI 1104. The position of the probe 1110 relative to the position of the slice in the first therapy ROI 1102 and/or relative to the position of the slice in the second therapy ROI 1104 may be used to determine where the probe is located relative to the live therapy ROI (e.g., the position of the therapy ROI in the patient at the time the third live 2D image was acquired), as explained below.

Based on the third position of the probe 1110 and the position of the matched, fifth 2D slice 1142, a transformation may be calculated of a portion of the therapy ROI in the third live 2D image relative to a position of a corresponding portion of the first therapy ROI 1102 of the first 3D pre-therapy anatomy model. Similarly, based on the third position of the probe 1110 and the matched, sixth 2D slice 1146, a transformation may be calculated of the portion of the therapy ROI in the third live 2D image relative to a position of a corresponding portion of the second therapy ROI 1104 of the second 3D pre-therapy anatomy model.

FIG. 11C further includes a diagram 1154 of current displacement of the third live 2D image relative to the position of the first therapy ROI 1102. The search space 1128 may define a position and/or orientation of the third live 2D image relative to the therapy ROIs 1102, 1104. A position 1148 of the third live 2D image acquired by the probe 1110 is shown relative to the positions 1122, 1124 of the therapy ROIs 1104, 1102, respectively. Thus, a position of the live therapy ROI with the probe 1110 in the third position can be inferred based on the transformation described above.

For the third position of the probe 1110 depicted in FIG. 11C, the position 1148 of the third live 2D image may be considered minimally displaced relative to the position 1124 of the first therapy ROI 1102 as the position 1148 of the third live 2D image is substantially equal to the position 1124 of the first therapy ROI 1102. In this way, by identifying a matching slice from a resampled 3D pre-therapy anatomy model (where the position of the therapy ROI is known), the current position of the therapy ROI relative to the probe may be determined, which may then be used (along with the modeled beam profile of the therapy beam emitted by the probe) to determine which sub-regions of the therapy ROI in the patient have or will receive a dose of therapeutic ultrasound.

The first, second, and third live 2D images acquired with the probe 1110 depicted in FIGS. 11A-11C demonstrate how a position of the live therapy ROI is updated in real-time. As a position of the probe changes relative to one or both of the first and second pre-therapy 3D anatomy models, an inferred position, based on a transformation, of the live therapy ROI changes. Respiratory motion may be compensated for in the ultrasound-mediated drug delivery system herein described by determining the position of the live therapy ROI in real-time. By compensating for respiratory motion, knowing the position of the live therapy ROI during a treatment, and displaying representative models in a GUI for user visualization, a user may be able to avoid applying doses to healthy tissue by targeting the probe, and consequently the therapeutic ultrasound beam, to the position of the live therapy ROI.

Figure 12:
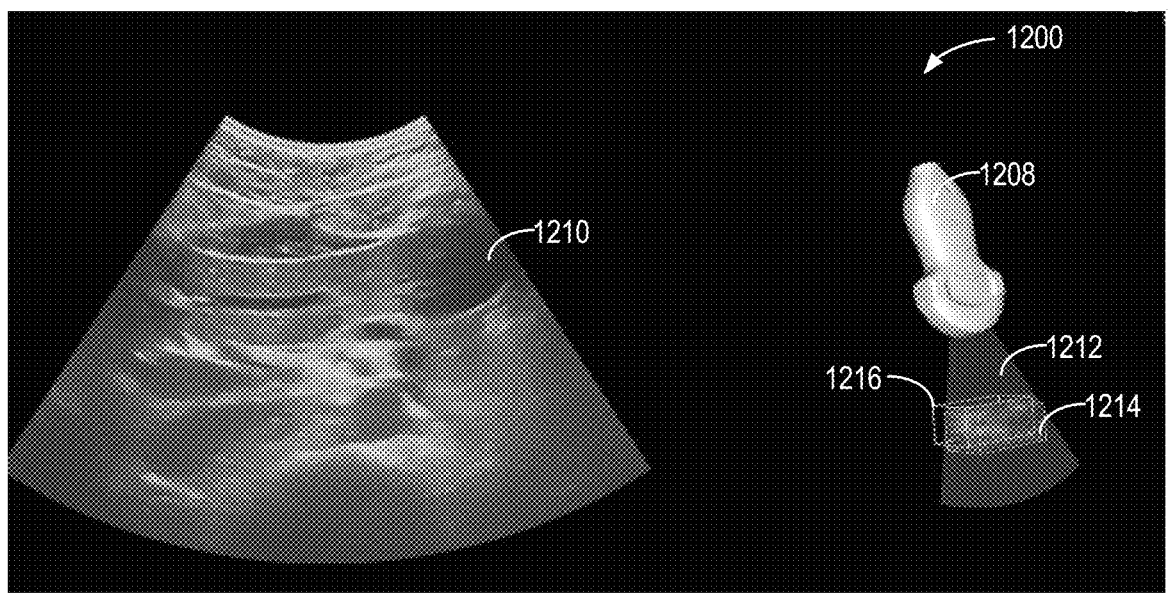
FIG. 12 shows an example GUI of the ultrasound system displaying a live 2D image and a 3D model of a therapy ROI at a first time.

Turning now to FIG. 12, an example GUI 1200 is shown, the GUI 1200 including a live 2D image 1210 acquired with a probe's field of view in a first position (e.g., at a first time) and a graphical representation of the probe 1208. The GUI 1200 may be displayed on a suitable display device (e.g., display device 118 of FIG. 1) of an imaging system, such as system 100 of FIG. 1. The GUI 1200 may be displayed during a therapy session for a patient.

The GUI 1200 further includes a graphical representation of a probe's field of view 1212 (e.g., a composite of all of the imaging beam), including a position of the probe's field of view 1212 relative to the probe 1208. A first 3D model 1216 of a pre-therapy therapy ROI (e.g., a therapy ROI derived from a 3D pre-therapy anatomy model for a selected respiratory phase) may also be overlaid in the GUI 1200 in a first position. The first 3D model 1216 may represent the therapy ROI at the selected respiratory phase. A second 3D model 1214 of a live therapy ROI in a second position may also be overlaid in the GUI 1200. The second position of the live therapy ROI may be based on a transformation determined based on a position of the live 2D image 1210 and a matched 2D slice, as described previously with reference to FIGS. 5 and 11A-C.

The second position of the live therapy ROI, in some examples, may be different from the position of the pre-therapy therapy ROI. As such, the second position of the second 3D model 1214 may be shown displaced from the first position of the first 3D model 1216. Thus, a user may see displacement between the first position of the first 3D model 1216 and the second position of the second 3D model 1214, allowing for the user to know where anatomy targeted for therapy is in real-time. Positions of the representation of the probe 1208, the probe's field of view 1212, the first 3D model 1216, and the second 3D model 1214 may be relative to each other equal or proportional to relative real-world coordinates of an ultrasound probe, a therapeutic ultrasound beam, and the anatomy targeted for therapy.

The second 3D model 1214 as shown in FIG. 12 comprises a grid of colored voxels, each voxel representative of a sub-region of the live therapy ROI. The sub-regions of the live therapy ROI may be derived from sub-regions of the pre-therapy therapy ROI, and relative positions of the sub-regions may change as the position of the live therapy ROI changes.

Figure 13:
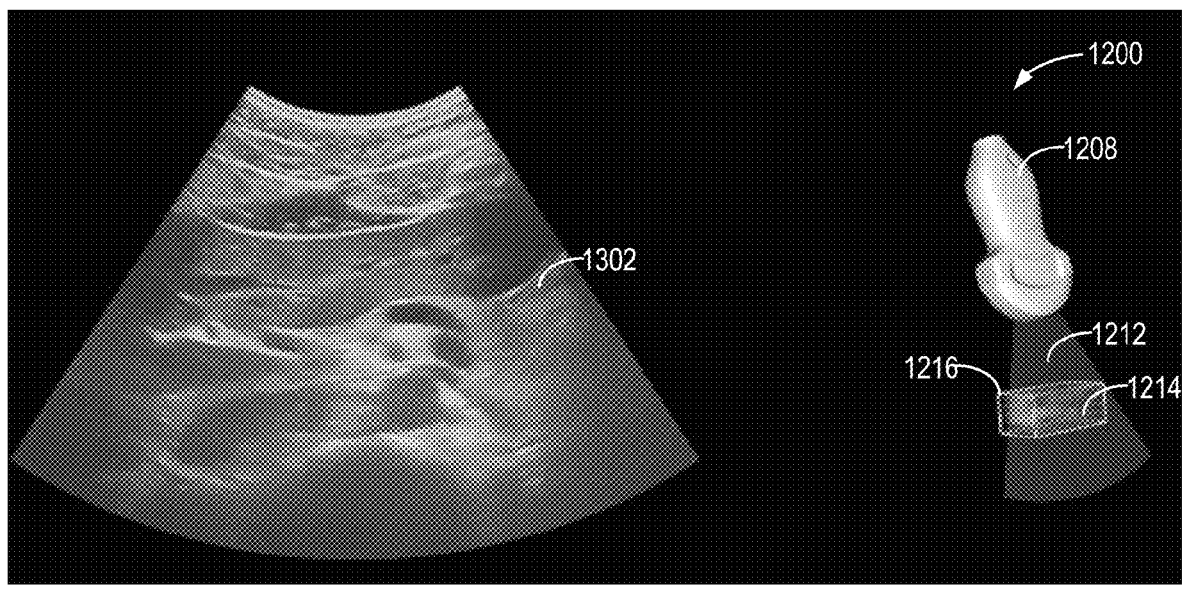
FIG. 13 shows the GUI displaying a live 2D image and the 3D model of a therapy ROI at a second time.

FIG. 13 depicts the GUI 1200 with the probe's field of view in a second position (e.g., at a second time). The graphical representation of the probe 1208 may be in a different location or orientation in the second position compared to the first position shown in FIG. 12. Thus, a second live 2D image 1302 may show different structures and/or different views of structures compared to the live 2D image 1210. Similar to the live 2D image 1210, the second live 2D image 1302 may depict portions of the patient's anatomy, including a portion of the live therapy ROI from the perspective of the probe. The probe's field of view 1212 may be displayed in the GUI in an orientation correlated with the orientation and position of the probe in the second position, similar to as discussed in FIG. 12.

The first 3D model 1216 of the pre-therapy therapy ROI has a fixed position and thus is in substantially the same position in real-world coordinates in the example of the GUI 1200 shown in FIG. 13 (e.g., when the probe's field of view is in the second position) as in the example of the GUI 1200 shown in FIG. 12 (e.g., when in the first position). In some examples, the pre-therapy therapy ROI may be from an inhalation phase of a respiratory cycle, or other imaged respiratory phase. The second 3D model 1214 of the live therapy ROI with the probe's field of view in the second position may be in a different position in real-world coordinates than the location of the second 3D model 1214 with the probe's field of view in the first position (e.g., as shown in FIG. 12). In the position depicted in FIG. 13, the second 3D model 1214 is in substantially the same location as the first 3D model 1216. In examples in which the first 3D model 1216 is of the inhalation phase, the second 3D model 1214 being in substantially the same location as the first 3D model 1216 indicates that the live therapy ROI and the patient being treated are in the inhalation phase.

A position of the live therapy ROI, and consequently the position of the displayed representative 3D model in the GUI 1200, may update in real time with each position of the probe. A position of the probe may be noted relative to the position of the live therapy ROI, such that even if the real-world coordinates of the probe are not changing, the position relative to the live therapy ROI may change as a function of time throughout the respiratory cycle of the patient. Consequently, real-time updates provide for different positions of the probe at each update. Furthermore, the second 3D model 1214 may change in position as displayed in the GUI 1200, indicating to the user gross motion of the anatomy targeted for therapy and allowing for compensation by the user in real time.

Figure 14:
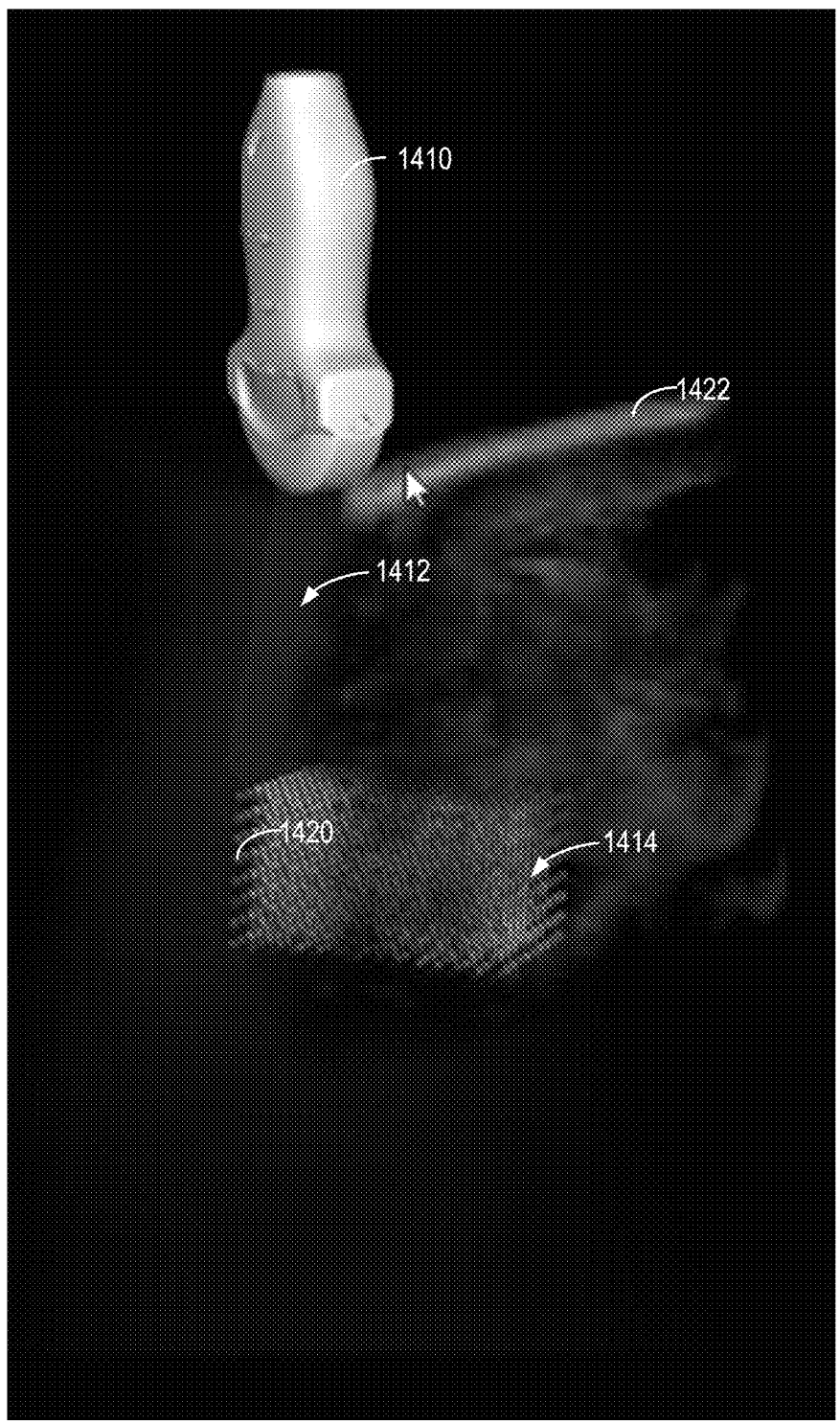
FIG. 14 shows an example display within the GUI of dose accumulation at a first stage.

Turning now to FIG. 14, an example of a displayed 3D model 1414 of a live therapy ROI is shown according to a first embodiment. The 3D model 1414 may be displayed in a GUI similar to GUI 1200 of FIGS. 12 and 13, the GUI being displayed via a display device such as display device 118 of an imaging system.

The GUI herein described may include a graphical representation of a probe 1410. The graphical representation of the probe 1410 may be oriented and positioned relative to real-world coordinates known based on one or more position sensors included in the probe. A modeled beam profile 1412 is overlaid alongside the graphical representation of the probe 1410 in the GUI. The modeled beam profile 1412 may be positioned with respect to the graphical representation of the probe 1410 according to a position of a respective therapeutic ultrasound beam emitted by the probe. The modeled beam profile 1412, as described above, may be simulated based on defined models chosen via user selection or may be measured and dynamically updated based on position and orientation of the target anatomy.

The GUI further includes the displayed 3D model 1414 as well as a volumetric anatomy model 1422. The volumetric anatomy model 1422 (e.g., a 3D pre-therapy anatomy model) may have been generated based on a plurality of 2D scout images for a selected respiratory phase, as described with reference to FIG. 3. A pre-therapy therapy ROI may then be extracted from the volumetric anatomy model based on annotation inputs, the pre-therapy therapy ROI divided into sub-regions and provided with a generated prescribed dose map, as described with reference to FIG. 4. The 3D model 1414 may be generated based on the divided pre-therapy therapy ROI, each sub-region being represented by a colored voxel, such as first voxel 1420, of the 3D model 1414. Intersection between the modeled beam profile 1412 and the 3D model 1414 of the live therapy ROI may indicate intersection between a location of the therapeutic ultrasound beam and the anatomy targeted for therapy. In this way, the user may be able to visualize which sub-regions are accumulating therapeutic ultrasound doses at any particular time, improving treatment accuracy and efficiency.

Each of the voxels may be colored according to a calculated cumulative dose. For example, first voxel 1420 is displayed as red, which may be a first color, indicating that the first voxel 1420 has not passed a first threshold of cumulative therapeutic ultrasound dose. After passing the first threshold in response to a first therapeutic ultrasound dose received at a sub-region represented by the first voxel 1420, the displayed color of the first voxel may be adjusted to a second color, such as orange.

In the first embodiment depicted in FIG. 14, a color of each of the colored voxels is adjusted in response to therapeutic ultrasound doses received at respective sub-regions. A final color, such as green, may indicate that a sub-region adjusted to the final color has passed a final threshold level and may have met or exceeded a target dose prescribed for the sub-region.

Figure 15:
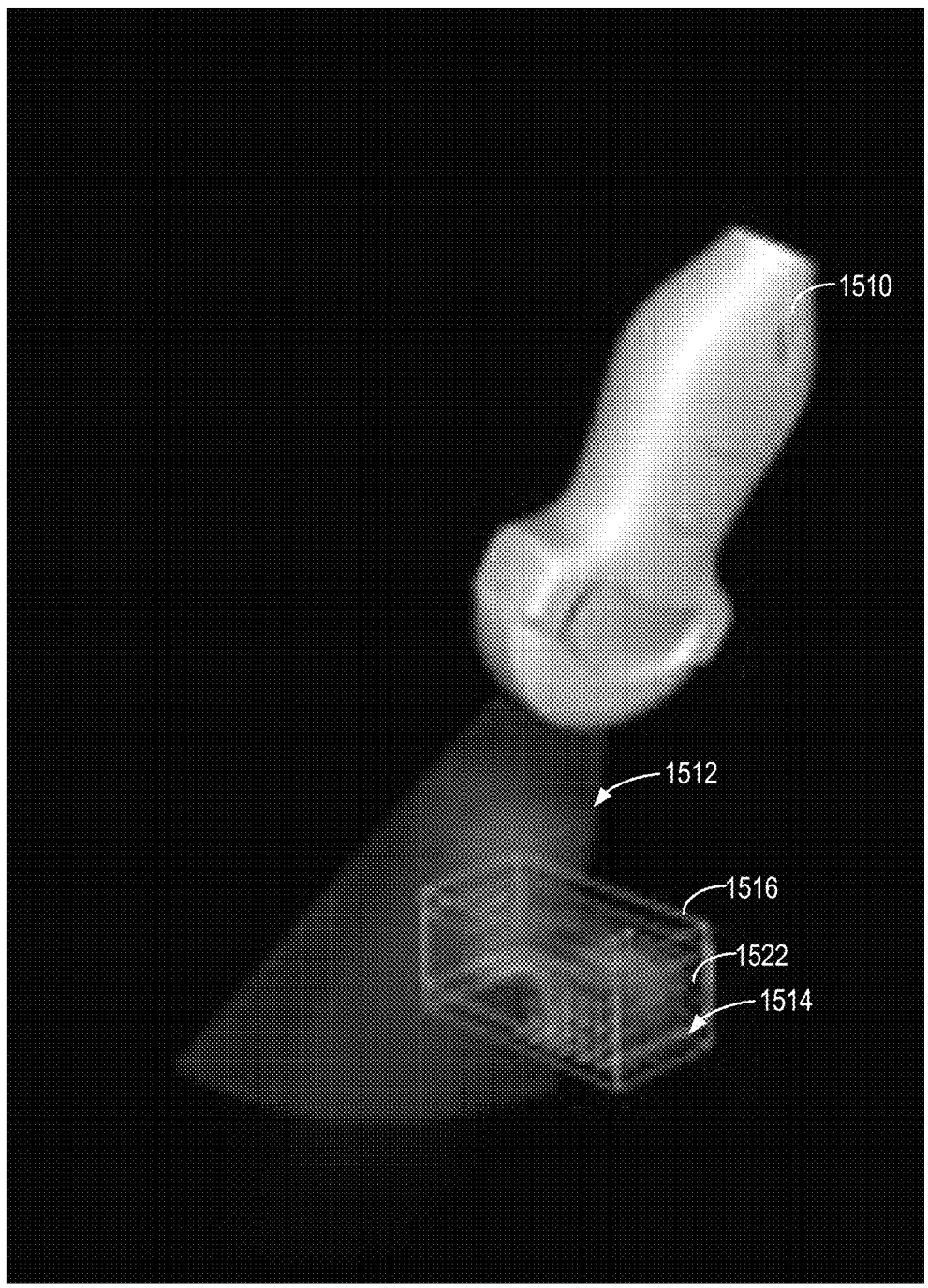
FIG. 15 shows an example display within the GUI of dose accumulation at a second stage.

Turning to FIG. 15, an example of a displayed 3D model 1514 of a live therapy ROI is shown according to a second embodiment. The 3D model 1514 may be displayed in a GUI similar to GUI 1200 of FIGS. 12 and 13, the GUI being displayed via a display device such as display device 118 of an imaging system.

In the second embodiment depicted in FIG. 15, a color of each of the colored voxels is adjusted in response to therapeutic ultrasound doses received at respective sub-regions, similar to the first embodiment depicted in FIG. 14. While the first embodiment includes the final color indicating that a sub-region has met or exceeded a target dose, in the second embodiment, a representative voxel in the 3D model 1514 may be removed from the GUI to indicate that a corresponding sub-region has met and/or exceeded the target dose. A variety of displayed colors of voxels are possible in both the first and second embodiment, including red, orange, yellow, green, and the like, based on cumulative therapeutic dose calculated.

The GUI in which the 3D model 1514 is displayed further includes a graphical representation of a probe 1510, a modeled beam profile 1512, a voxel 1522 of the 3D model 1514, and a second 3D model 1516. The second 3D model 1516 may be representative of a pre-therapy therapy ROI, as explained further with reference to FIGS. 12 and 13. The 3D model 1514 may be representative of a live therapy ROI.

A technical effect of the systems and methods described herein for an ultrasound-guided therapy system is that guidance for positioning of a freehand 2D probe is improved. By allowing for respiratory motion compensation with reference to real-world coordinates, more efficient and accurate treatments may be administered while reducing processing times for the imaging system. Additionally, display of models, including display of a voxelized 3D model of a region targeted for therapy, may increase accuracy of therapy administration, allowing for avoidance of tissues not intended to receive therapy.

The disclosure also provides support for a method, comprising: for one or more therapeutic ultrasound beams of a plurality of therapeutic ultrasound beams delivered to a therapy region of interest (ROI) of a patient via an ultrasound probe, identifying a respective location of the one or more therapeutic ultrasound beams relative to the therapy ROI of the patient based on: a respective modeled beam profile of the one or more therapeutic ultrasound beams, a respective live two-dimensional (2D) image of the therapy ROI acquired with the ultrasound probe, a respective position of the ultrasound probe, and a known prior location of the therapy ROI, calculating a cumulative therapeutic ultrasound dose received at each sub-region of the therapy ROI based on the respective location of the one or more therapeutic ultrasound beams, and outputting an indication of the cumulative therapeutic ultrasound dose received at each sub-region of the therapy ROI for display on a display device. In a first example of the method, identifying the respective location of the one or more therapeutic ultrasound beams relative to the therapy ROI of the patient comprises, for a first therapeutic ultrasound beam of the one or more therapeutic ultrasound beams: obtaining a first live 2D image acquired at substantially the same time as the first therapeutic ultrasound beam was delivered, and determining a first location of the first therapeutic ultrasound beam based on a first modeled beam profile for the first therapeutic ultrasound beam, the first live 2D image, and a second location of the ultrasound probe while the first live 2D image was acquired, the second location relative to the known prior location of the therapy ROI. In a second example of the method, optionally including the first example, determining the first location of the first therapeutic ultrasound beam is based on the first modeled beam profile for the first therapeutic ultrasound beam, the first live 2D image, and the second location of the ultrasound probe comprises: identifying a selected 2D slice of a 3D pre-therapy anatomy model that matches the first live 2D image, the 3D pre-therapy anatomy model generated from a set of 2D images of the therapy ROI acquired with the ultrasound probe during a selected respiratory phase and mapped to real-world coordinates in order to determine the known prior location of the therapy ROI during the selected respiratory phase, identifying real-world coordinates of the selected 2D slice, determining a transformation based on the identified real-world coordinates of the selected 2D slice and the second location of the ultrasound probe, and determining the first location based on the transformation. In a third example of the method, optionally including one or both of the first and second examples, identifying the selected 2D slice of the 3D pre-therapy anatomy model that matches the first live 2D image comprises: resampling the 3D pre-therapy anatomy model into a plurality of 2D slices based on an orientation and a location of the ultrasound probe when the first live 2D image was acquired, comparing the first live 2D image to each of one or more 2D slices of the plurality of 2D slices including the selected 2D slice to identify an image similarity metric for each 2D slice, and identifying the selected 2D slice as a 2D slice of the one or more 2D slices that has a highest image similarity metric. In a fourth example of the method, optionally including one or more or each of the first through third examples, the image similarity metric is determined using cross correlation, mutual information, pattern intensity, mean squared error, or structural similarity index. In a fifth example of the method, optionally including one or more or each of the first through fourth examples, the first live 2D image is acquired with ultrasound signals of a first frequency range and the first therapeutic ultrasound beam includes ultrasound signals output at a second frequency range, different than the first frequency range. In a sixth example of the method, optionally including one or more or each of the first through fifth examples, outputting the indication of the cumulative therapeutic ultrasound dose received at each sub-region of the therapy ROI for display on the display device comprises outputting a graphical representation of the therapy ROI with the cumulative therapeutic ultrasound dose received at each sub-region of the therapy ROI indicated via one or more colors of the graphical representation. In a seventh example of the method, optionally including one or more or each of the first through sixth examples, the graphical representation of the therapy ROI is generated at least in part based on an identification of the therapy ROI within a 3D pre-therapy anatomy model generated from a set of 2D images of the therapy ROI acquired with the ultrasound probe.

The disclosure also provides support for a system, comprising: an ultrasound probe including a plurality of transducers and one or more position sensors, a display, and a computing device operably coupled to the ultrasound probe and the display and including one or more processors configured to execute instructions stored in memory to: control the ultrasound probe to deliver a therapeutic ultrasound beam to a therapy region of interest (ROI) of a patient, the therapy ROI including a plurality of sub-regions, control the ultrasound probe to acquire a live two-dimensional (2D) image of the therapy ROI, identify a location of the therapeutic ultrasound beam relative to the therapy ROI of the patient based on a modeled beam profile of the therapeutic ultrasound beam, the live 2D image, a position of the ultrasound probe determined based on output from the one or more position sensors, and a known prior location of the therapy ROI, calculate a respective cumulative therapeutic ultrasound dose received at each sub-region of the therapy ROI based on the location of the therapeutic ultrasound beam, and output an indication of the cumulative therapeutic ultrasound dose received at each sub-region of the therapy ROI for display on a display device. In a first example of the system, the ultrasound probe is controlled to acquire the live 2D image with ultrasound signals of a first frequency range and the therapeutic ultrasound beam includes ultrasound signals output at a second frequency range. In a second example of the system, optionally including the first example, the first frequency range includes 2-6 MHz and the second frequency range includes 0.5-1 MHZ. In a third example of the system, optionally including one or both of the first and second examples, the one or more processors are further configured to obtain a prescribed dose map of the therapy ROI, and wherein outputting the indication of the cumulative therapeutic ultrasound dose received at each sub-region of the therapy ROI for display on the display device comprises outputting an indication of the cumulative therapeutic ultrasound dose received at each sub-region of the therapy ROI relative to a respective threshold level indicated by the prescribed dose map. In a fourth example of the system, optionally including one or more or each of the first through third examples, calculating the respective cumulative therapeutic ultrasound dose received at each sub-region of the therapy ROI based on the location of the therapeutic ultrasound beam comprises: determining, based on the modeled beam profile and the location of the therapeutic ultrasound beam, one or more sub-regions of the therapy ROI that intersect the modeled beam profile, and calculating the respective cumulative therapeutic ultrasound dose for each of the identified one or more sub-regions by adding a current therapeutic ultrasound dose for each of the identified one or more sub-regions to a respective prior cumulative therapeutic ultrasound dose for each of the identified one or more sub-regions, where the current therapeutic ultrasound dose is in proportion to a spatial amplitude of the modeled beam profile. In a fifth example of the system, optionally including one or more or each of the first through fourth examples, outputting the indication of the cumulative therapeutic ultrasound dose received at each sub-region of the therapy ROI for display on the display device comprises outputting a graphical representation of the therapy ROI with the cumulative therapeutic ultrasound dose received at each sub-region of the therapy ROI indicated via one or more colors of the graphical representation.

The disclosure also provides support for a method, comprising: acquiring, via an ultrasound probe, one or more sets of images of a patient and corresponding probe location data during one or more respiratory phases, generating one or more volumetric anatomy models based on the one or more sets of images, localizing each of the one or more volumetric anatomy models to real-world coordinates based on the probe location data, identifying a region of interest (ROI) of the patient in each of the one or more volumetric anatomy models, obtaining a prescribed dose map of the ROI, acquiring, via the ultrasound probe, a live two-dimensional (2D) image of a portion of the ROI of the patient, matching the live 2D image to a slice of the one or more volumetric anatomy models, determining a transformation of the portion of the ROI in the live 2D image relative to a position of the portion of the ROI in the one or more volumetric anatomy models based on the matched slice and further based on probe location data of the ultrasound probe when the live 2D image was acquired, controlling the ultrasound probe to output a therapeutic ultrasound beam to the ROI of the patient, determining a therapeutic ultrasound dose received by each sub-region of the ROI from the therapeutic ultrasound beam based on a modeled beam profile of the therapeutic ultrasound beam and the transformation, and displaying an indication of the therapeutic ultrasound dose received at each sub-region of the ROI on a display device. In a first example of the method, acquiring the one or more sets of images of the patient and corresponding probe location data during one or more respiratory phases comprises acquiring a first set of images of the patient and corresponding first probe location data during full inhalation and acquiring a second set of images of the patient and corresponding second probe location data during full exhalation, and wherein generating one or more volumetric anatomy models based on the one or more sets of images comprises generating a first volumetric anatomy model based on the first set of images and first probe location data and generating a second volumetric anatomy model based on the second set of images and second probe location data. In a second example of the method, optionally including the first example, matching the live 2D image to the slice of the one or more volumetric anatomy models comprises: resampling the first volumetric anatomy model or the second volumetric anatomy model into a collection of 2D slices defined by a search space that is based on an orientation of the ultrasound probe at which the live 2D image was acquired and an observed 3D trajectory between the first volumetric anatomy model and the second volumetric anatomy model, comparing the live 2D image to each slice of the collection of 2D slices to identify an image similarity metric for each slice, and identifying the matching slice as a slice of the collection of 2D slices that has a highest image similarity metric. In a third example of the method, optionally including one or both of the first and second examples, displaying the indication of the therapeutic ultrasound dose received at each sub-region of the ROI on the display device comprises displaying a representation of a 3D model of the ROI comprising a grid of voxels, each voxel representing a respective sub-region of the ROI of the patient, the 3D model of the ROI generated based on an identification of the ROI in the one or more volumetric anatomy models. In a fourth example of the method, optionally including one or more or each of the first through third examples, the method further comprises: displaying the modeled beam profile and/or the one or more volumetric anatomy models on the display device. In a fifth example of the method, optionally including one or more or each of the first through fourth examples, the method further comprises: adjusting a displayed position of the 3D model based on the transformation.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
for one or more therapeutic ultrasound beams of a plurality of therapeutic ultrasound beams delivered to a therapy region of interest (ROI) of a patient via an ultrasound probe, identifying a respective location of the one or more therapeutic ultrasound beams relative to the therapy ROI of the patient based on: a respective modeled beam profile of the one or more therapeutic ultrasound beams, a respective live two-dimensional (2D) image of the therapy ROI acquired with the ultrasound probe, a respective position of the ultrasound probe, and a known prior location of the therapy ROI, wherein identifying the respective location comprises locating a selected 2D slice of a 3D pre-therapy anatomy model that matches the respective live 2D image of the therapy ROI acquired with the ultrasound probe;
calculating a cumulative therapeutic ultrasound dose received at each sub-region of the therapy ROI based on the respective location of the one or more therapeutic ultrasound beams; and
outputting an indication of the cumulative therapeutic ultrasound dose received at each sub-region of the therapy ROI for display on a display device.

2. The method of claim 1, wherein identifying the respective location of the one or more therapeutic ultrasound beams relative to the therapy ROI of the patient comprises, for a first therapeutic ultrasound beam of the one or more therapeutic ultrasound beams:
obtaining a first live 2D image acquired at substantially the same time as the first therapeutic ultrasound beam was delivered; and
determining a first location of the first therapeutic ultrasound beam based on a first modeled beam profile for the first therapeutic ultrasound beam, the first live 2D image, and a second location of the ultrasound probe while the first live 2D image was acquired, the second location relative to the known prior location of the therapy ROI.

3. The method of claim 1, wherein identifying the respective location by locating the selected 2D slice that matches the respective live 2D image comprises:
identifying real-world coordinates of the selected 2D slice from the 3D pre-therapy anatomy model, wherein the 3D pre-therapy anatomy model was generated from a set of 2D images of the therapy ROI acquired with the ultrasound probe during a selected respiratory phase and mapped to real-world coordinates;
determining a transformation based on the identified real-world coordinates of the selected 2D slice and the respective position of the ultrasound probe; and
determining the respective location based on the transformation.

4. The method of claim 3, wherein identifying the selected 2D slice of the 3D pre-therapy anatomy model that matches the respective live 2D image comprises:
resampling the 3D pre-therapy anatomy model into a plurality of 2D slices based on an orientation and a location of the ultrasound probe when the first live 2D image was acquired;
comparing the respective live 2D image to each of one or more 2D slices of the plurality of 2D slices including the selected 2D slice to identify an image similarity metric for each 2D slice; and
identifying the selected 2D slice as a 2D slice of the one or more 2D slices that has a highest image similarity metric.

5. The method of claim 4, wherein the image similarity metric is determined using cross correlation, mutual information, pattern intensity, mean squared error, or structural similarity index.

6. The method of claim 2, wherein the first live 2D image is acquired with ultrasound signals of a first frequency range and the first therapeutic ultrasound beam includes ultrasound signals output at a second frequency range, different than the first frequency range.

7. The method of claim 1, wherein outputting the indication of the cumulative therapeutic ultrasound dose received at each sub-region of the therapy ROI for display on the display device comprises outputting a graphical representation of the therapy ROI with the cumulative therapeutic ultrasound dose received at each sub-region of the therapy ROI indicated via one or more colors of the graphical representation.

8. The method of claim 7, wherein the graphical representation of the therapy ROI is generated at least in part based on an identification of the therapy ROI within a 3D pre-therapy anatomy model generated from a set of 2D images of the therapy ROI acquired with the ultrasound probe.

9. A system, comprising:
an ultrasound probe including a plurality of transducers and one or more position sensors;
a display; and
a computing device operably coupled to the ultrasound probe and the display and including one or more processors configured to execute instructions stored in memory to:
control the ultrasound probe to deliver a therapeutic ultrasound beam to a therapy region of interest (ROI) of a patient, the therapy ROI including a plurality of sub-regions;
control the ultrasound probe to acquire a live two-dimensional (2D) image of the therapy ROI;
identify a location of the therapeutic ultrasound beam relative to the therapy ROI of the patient based on a modeled beam profile of the therapeutic ultrasound beam, the live 2D image, a position of the ultrasound probe determined based on output from the one or more position sensors, and a known prior location of the therapy ROI;
calculate a respective cumulative therapeutic ultrasound dose received at each sub-region of the therapy ROI based on the location of the therapeutic ultrasound beam; and
output an indication of the cumulative therapeutic ultrasound dose received at each sub-region of the therapy ROI relative to a respective threshold level indicated by a prescribed dose map for display on a display device.

10. The system of claim 9, wherein the ultrasound probe is controlled to acquire the live 2D image with ultrasound signals of a first frequency range and the therapeutic ultrasound beam includes ultrasound signals output at a second frequency range.

11. The system of claim 10, wherein the first frequency range includes 2-6 MHz and the second frequency range includes 0.5-1 MHz.

12. The system of claim 9, wherein calculating the respective cumulative therapeutic ultrasound dose received at each sub-region of the therapy ROI based on the location of the therapeutic ultrasound beam comprises:
determining, based on the modeled beam profile and the location of the therapeutic ultrasound beam, one or more sub-regions of the therapy ROI that intersect the modeled beam profile; and
calculating the respective cumulative therapeutic ultrasound dose for each of the identified one or more sub-regions by adding a current therapeutic ultrasound dose for each of the identified one or more sub-regions to a respective prior cumulative therapeutic ultrasound dose for each of the identified one or more sub-regions, where the current therapeutic ultrasound dose is in proportion to a spatial amplitude of the modeled beam profile.

13. The system of claim 9, wherein outputting the indication of the cumulative therapeutic ultrasound dose received at each sub-region of the therapy ROI for display on the display device comprises outputting a graphical representation of the therapy ROI with the cumulative therapeutic ultrasound dose received at each sub-region of the therapy ROI indicated via one or more colors of the graphical representation.

14. A method, comprising:
acquiring, via an ultrasound probe, one or more sets of images of a patient and corresponding probe location data during one or more respiratory phases;
generating one or more volumetric anatomy models based on the one or more sets of images;
localizing each of the one or more volumetric anatomy models to real-world coordinates based on the probe location data;
identifying a region of interest (ROI) of the patient in each of the one or more volumetric anatomy models;
obtaining a prescribed dose map of the ROI;
acquiring, via the ultrasound probe, a live two-dimensional (2D) image of a portion of the ROI of the patient;
matching the live 2D image to a slice of the one or more volumetric anatomy models;
determining a transformation of the portion of the ROI in the live 2D image relative to a position of the portion of the ROI in the one or more volumetric anatomy models based on the matched slice and further based on probe location data of the ultrasound probe when the live 2D image was acquired;
controlling the ultrasound probe to output a therapeutic ultrasound beam to the ROI of the patient;
determining a therapeutic ultrasound dose received by each sub-region of the ROI from the therapeutic ultrasound beam based on a modeled beam profile of the therapeutic ultrasound beam and the transformation; and
displaying an indication of the therapeutic ultrasound dose received at each sub-region of the ROI on a display device.

15. The method of claim 14, wherein acquiring the one or more sets of images of the patient and corresponding probe location data during one or more respiratory phases comprises acquiring a first set of images of the patient and corresponding first probe location data during full inhalation and acquiring a second set of images of the patient and corresponding second probe location data during full exhalation, and wherein generating one or more volumetric anatomy models based on the one or more sets of images comprises generating a first volumetric anatomy model based on the first set of images and first probe location data and generating a second volumetric anatomy model based on the second set of images and second probe location data.

16. The method of claim 15, wherein matching the live 2D image to the slice of the one or more volumetric anatomy models comprises:

resampling the first volumetric anatomy model or the second volumetric anatomy model into a collection of 2D slices defined by a search space that is based on an orientation of the ultrasound probe at which the live 2D image was acquired and an observed 3D trajectory between the first volumetric anatomy model and the second volumetric anatomy model;

comparing the live 2D image to each slice of the collection of 2D slices to identify an image similarity metric for each slice; and identifying the matching slice as a slice of the collection of 2D slices that has a highest image similarity metric.

17. The method of claim 14, wherein displaying the indication of the therapeutic ultrasound dose received at each sub-region of the ROI on the display device comprises displaying a representation of a 3D model of the ROI comprising a grid of voxels, each voxel representing a respective sub-region of the ROI of the patient, the 3D model of the ROI generated based on an identification of the ROI in the one or more volumetric anatomy models.

18. The method of claim 17, further comprising displaying the modeled beam profile and/or the one or more volumetric anatomy models on the display device.

19. The method of claim 17, further comprising adjusting a displayed position of the 3D model based on the transformation.

* * * * *